(12) United States Patent
Park et al.

(10) Patent No.: US 10,568,039 B2
(45) Date of Patent: Feb. 18, 2020

(54) ELECTRONIC DEVICE SUPPORTING BEAMFORMING AND METHOD OF OPERATING ELECTRONIC DEVICE

(71) Applicant: Samsung Electronics Co., Ltd., Suwon-si, Gyeonggi-do (KR)

(72) Inventors: Sungchul Park, Seoul (KR); Wonjoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/903,320

(22) Filed: Feb. 23, 2018

(65) Prior Publication Data
US 2018/0262994 A1    Sep. 13, 2018

(30) Foreign Application Priority Data
Mar. 8, 2017 (KR) .......... 10-2017-0029273

(51) Int. Cl.
*H04W 52/14* (2009.01)
*H04W 52/16* (2009.01)
*H04B 7/06* (2006.01)
*H04W 56/00* (2009.01)

(52) U.S. Cl.
CPC ........ *H04W 52/146* (2013.01); *H04B 7/0617* (2013.01); *H04W 52/16* (2013.01); *H04W 56/0045* (2013.01)

(58) Field of Classification Search
CPC ............................ H04W 52/146; H04W 52/42
USPC ............. 455/522, 69, 66.1, 67.11, 75, 550.1
See application file for complete search history.

(56) References Cited

U.S. PATENT DOCUMENTS

| 2009/0296855 | A1* | 12/2009 | Kitamura | H03F 1/0261 |
|---|---|---|---|---|
| | | | | 375/297 |
| 2012/0126893 | A1* | 5/2012 | Yamanouchi | H03F 1/0244 |
| | | | | 330/135 |
| 2014/0153461 | A1* | 6/2014 | Lorenz | H04W 52/0245 |
| | | | | 370/311 |

* cited by examiner

*Primary Examiner* — John J Lee
(74) *Attorney, Agent, or Firm* — Jefferson IP Law, LLP

(57) ABSTRACT

An electronic device supporting beamforming and a method of operating the electronic device are provided. The electronic device includes a first amplifier configured to amplify a first signal and a second amplifier for amplifying a second signal, a power control module configured to generate first power control information based at least on a first attribute of the first signal and generate second power control information based at least on the first power control information and a second attribute of the second signal, and at least one power supply module configured to control power supplied to the first amplifier based at least on the first power control information and control power supplied to the second amplifier based at least on the second power control information.

26 Claims, 18 Drawing Sheets

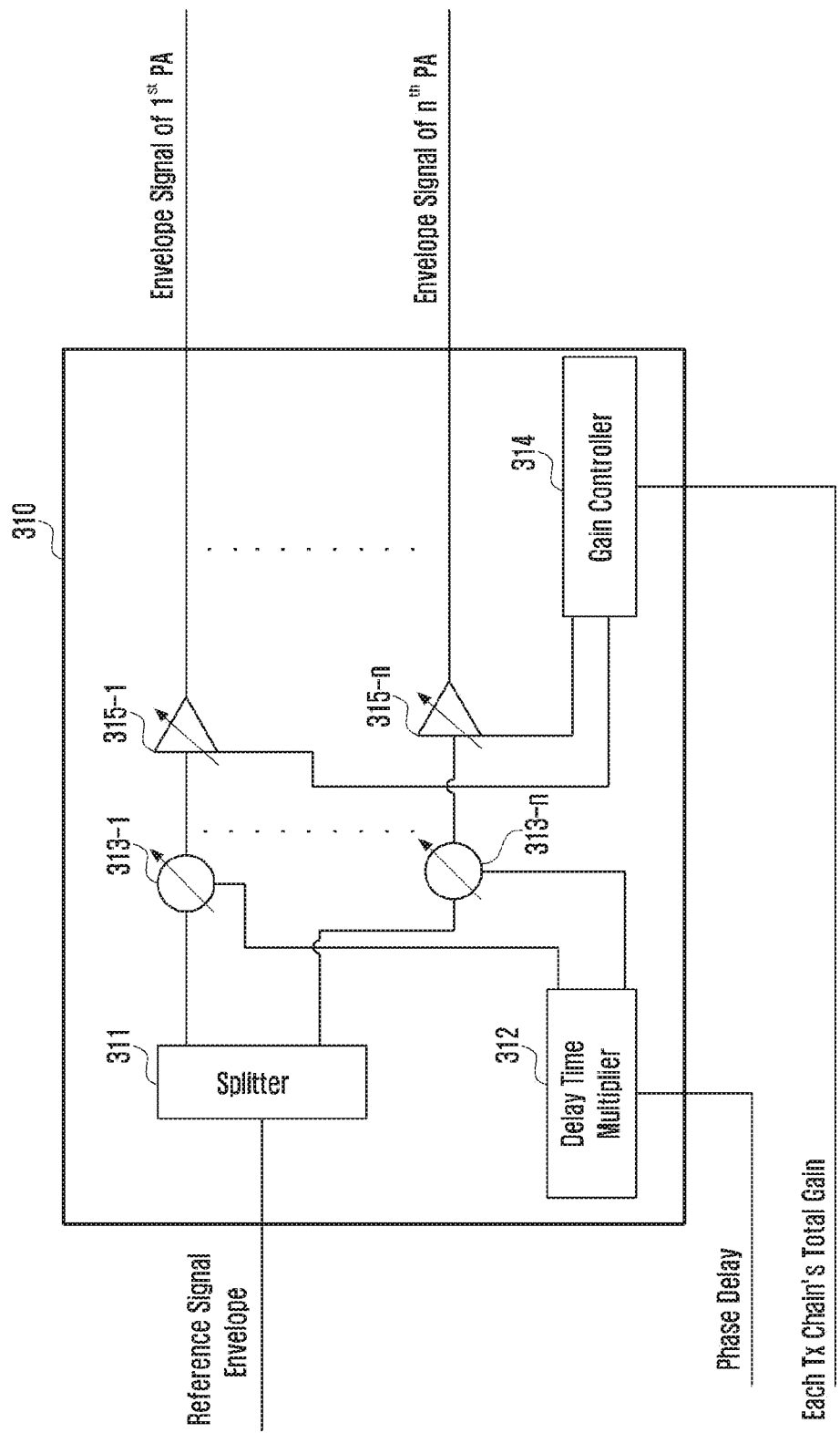

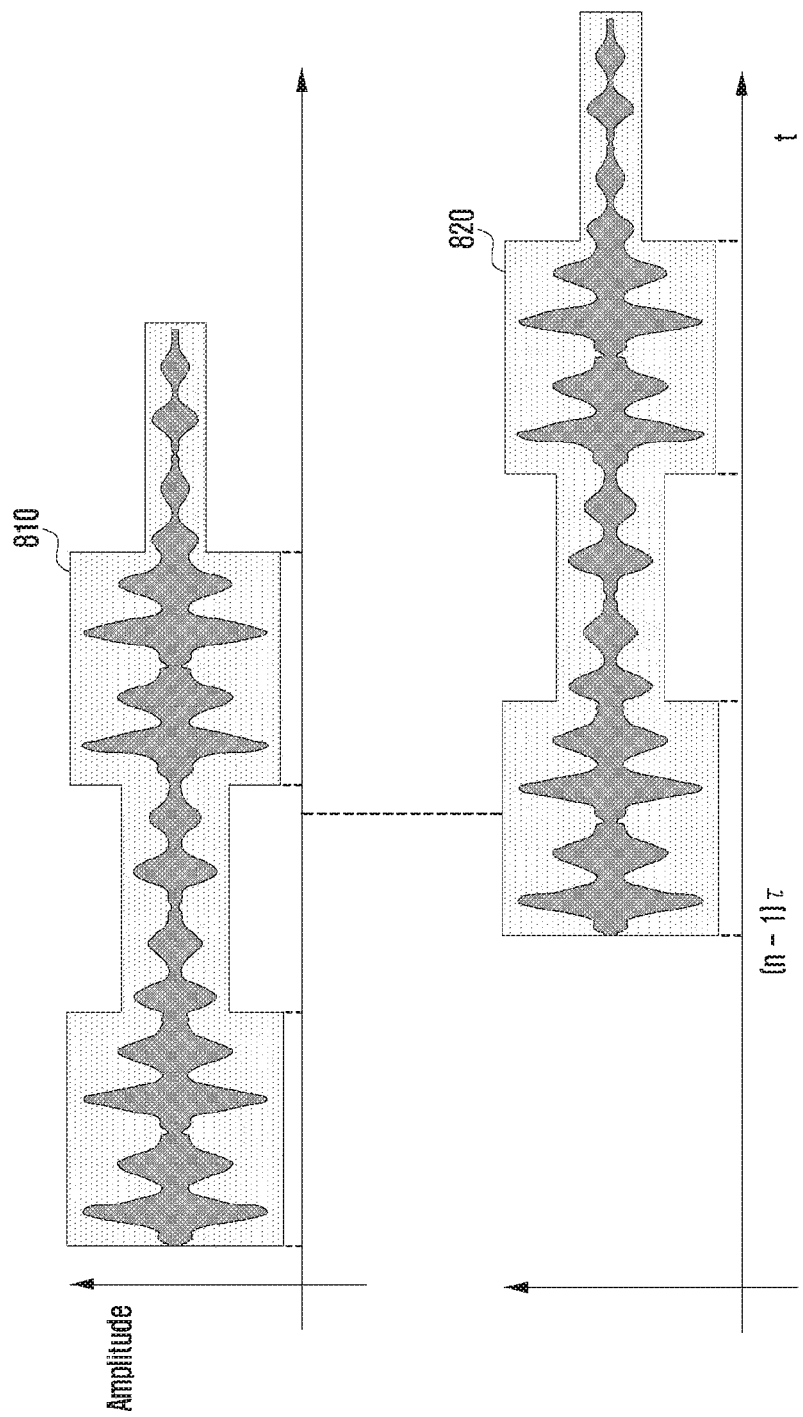

ELECTRONIC DEVICE SUPPORTING BEAMFORMING AND METHOD OF OPERATING ELECTRONIC DEVICE

CROSS-REFERENCE TO RELATED APPLICATION(S)

This application is based on and claims priority under 35 U.S.C. § 119 to Korean Patent Application No. 10-2017-0029273, filed on Mar. 8, 2017, in the Korean Intellectual Property Office, the disclosure of which is incorporated by reference herein in its entirety.

TECHNICAL FIELD

The disclosure relates to an electronic device supporting beamforming and a method of operating an electronic device.

BACKGROUND

As various electronic devices such as a smart phone, a tablet personal computer (PC), a portable multimedia player (PMP), a personal digital assistant (PDA), a laptop PC and a wearable device have become popular, various wireless communication technologies by which various electronic devices are used to perform communications are being developed.

In recent years, wireless communication technologies using a technology of performing beamforming using a plurality of antennas among wireless communication technologies have been increasing. The beamforming is a technology of outputting/receiving a signal output through a plurality of antennas toward a specific direction and means a technology of forming a beam having a high signal gain in a specific direction. The beamforming, which is one of the technologies of using multiple antennas, can be used as a method of improving connection reliability in wireless environment by using multiple antennas at a receiver or a transmitter.

The above information is presented as background information only to assist with an understanding of the disclosure. No determination has been made, and no assertion is made, as to whether any of the above might be applicable as prior art with regard to the disclosure.

SUMMARY

In order to transmit a signal a high frequency band signal in an electronic device using a plurality of antennas, a beamforming transmission technology can be used. The higher the frequency band of the signal, the stronger the fading phenomenon of the signal and the lower the transmission efficiency of the signal. In order to use the beamforming transmission technology, there is a need to generate and control signals output to each of the plurality of antennas. The number of signals to be controlled may be increased in proportion to the number of antennas. As the number of antennas is increased, the number of signals is increased. Therefore, the controlling overhead is increased in controlling each of the plurality of signals, and the power consumed to process the signals may be increased.

Aspects of the disclosure are to address at least the above-mentioned problems and/or disadvantages and to provide at least the advantages described below. Accordingly, an aspect of the disclosure is to provide an apparatus and method for supporting beamforming In accordance with an aspect of the disclosure, an electronic device is provided. The electronic device includes a first amplifier configured to amplify a first signal and a second amplifier for amplifying a second signal, a first antenna configured to correspond to the first amplifier and a second antenna corresponding to the second amplifier, at least one power supply module configured to supply power to the first amplifier and the second amplifier, and a processor, wherein the processor may be configured to be generate first power control information based at least in part on amplitude information of the first signal, generate second power control information based at least in part on the first power control information and a delay time of the second signal with respect to the first signal, control the power supplied to the first amplifier to amplify the first signal using the at least one power supply module based at least in part on the first power control information and discharge the amplified first signal through the first antenna, and control the power supplied to the second amplifier to amplify the second signal using the at least one power supply module based at least in part on the second power control information and discharge the amplified second signal through the second antenna after the discharge of the first signal.

In accordance with an aspect of the disclosure, an electronic device is provided. The electronic device includes a plurality of amplifiers configured to include a first amplifier for amplifying a first signal and a second amplifier for amplifying a second signal, at least one power supply module configured to supply power to the first amplifier and the second amplifier, and a processor, wherein the processor may be configured to generate first power control information based at least on an attribute of the first signal, generate second power control information based at least in part on the first power control information and the attribute of the second signal, control the power supplied to the first amplifier to amplify the first signal using the at least one power supply module based at least in part on the first power control information, and control the power supplied to the second amplifier to amplify the second signal using the at least one power supply module based at least in part on the second power control information.

In accordance with an aspect of the disclosure; an electronic device is provided. The electronic device includes a first amplifier configured to amplify a first signal and a second amplifier for amplifying a second signal, a power control module configured to generate first power control information based on a first attribute of the first signal and generate second power control information based at least in part on the first power control information and a second attribute of the second signal, and at least one power supply module configured to control power supplied to the first amplifier based at least on the first power control information and control power supplied to the second amplifier based at least on the second power control information.

The electronic device supporting a beamforming and the method of operating an electronic device according to various embodiments of the disclosure can generate the signals output from the plurality of antennas using the amplitude information of the reference signal, the traveling direction of the signals forming the beam, and the delay time between the respective signals depending on the angle with respect to the virtual surface including the antennas, thereby generating the envelope information of the plurality of signals using only one signal.

In addition, the electronic device supporting beamforming and the method of operating an electronic device according to various embodiments of the disclosure can generate the signal output from the plurality of antennas using the amplitude information of the reference signal and the delay time depending on the beamforming angle, thereby reducing the time consumed to process the signal.

In addition, the electronic device supporting beamforming and the method of operating an electronic device according to various embodiments of the disclosure can use the envelope tracking mode of the reference signal or the average power tracking (APT) mode of the reference signal, thereby reducing the power consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a block diagram of a processor, in the electronic device according to various embodiments of the disclosure;

FIG. 8 is a diagram illustrating generating an antenna signal using an average power tracking (APT) technology illustrated in FIG. 7B according to various embodiments of the disclosure;

Throughout the drawings, like reference numerals will be understood to refer to like parts, components, and structures.

DETAILED DESCRIPTION

Figure 1:
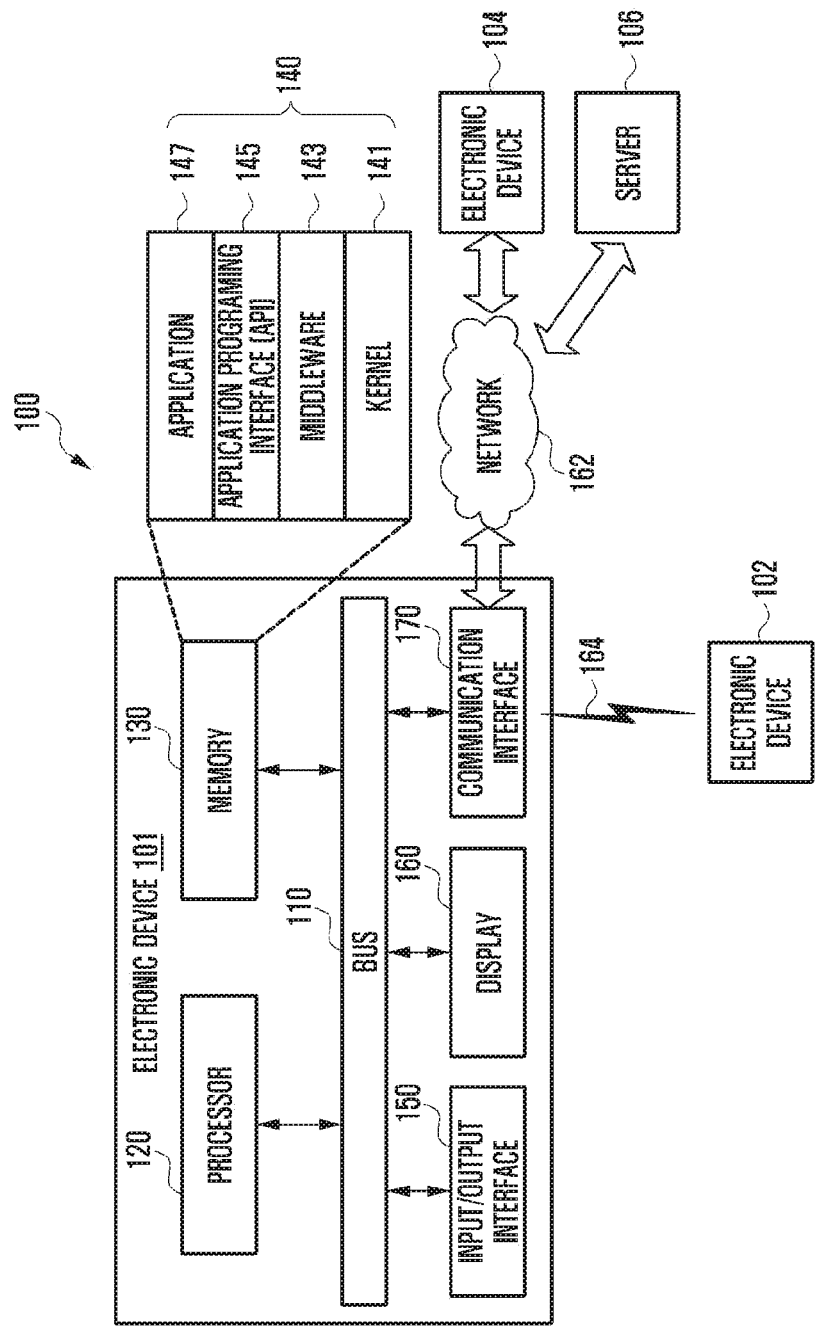
FIG. 1 is a diagram illustrating an electronic device within network environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may generally refer to a recited characteristic, parameter, or value that need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The expressions "include" and "may include" which may be used in the disclosure may refer, for example, to the presence of disclosed functions, operations, and elements but are not intended to limit one or more additional functions, operations, and elements. In the disclosure, the terms "include" and/or "have" may be understood to refer, for example, to a certain characteristic, number, operation, element, component or a combination thereof, but are not intended to be construed to exclude the existence of or a possibility of addition of one or more other characteristics, numbers, operations, elements, components or combinations thereof Furthermore, in the disclosure, the expression "and/or" includes any and all combinations of the associated listed words. For example, the expression "A and/or B" may include A, B, or both A and B.

In an embodiment of the disclosure, expressions including ordinal numbers, such as "first" and "second," and the like, may modify various elements. However, such elements are not limited by the above expressions. For example, the above expressions do not limit the sequence and/or importance of the elements. The above expressions are used merely to distinguish an element from other elements. For example, a first user device and a second user device may indicate different user devices, but both of them are user devices. For example, a first element may be referred to as a second element, and similarly, a second element may also be referred to as a first element without departing from the scope of the disclosure.

In a case where a component is referred to as being "connected" to or "accessed" by another component, it is intended that not only the component is directly connected to or accessed by the other component, but also there may exist another component between them. In addition, in a case where a component is referred to as being "directly connected" to or "directly accessed" by another component, it is intended that there is no component therebetween.

An electronic device according to the disclosure may be a device including a communication function. For example, and without limitation, the device may correspond to a combination of at least one of a smartphone, a tablet personal computer (PC), a mobile phone, a video phone, an electronic-book (e-book) reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, a vacuum, an oven, a microwave, a washing machine, an air cleaner, and the like), an artificial intelligence robot, a television (TV), a digital versatile disc (DVD) player, an audio device, various medical devices (for example, a magnetic resonance angiography (MRA) device, a magnetic resonance imaging (MRI) device, a computed tomography (CT) device, a scanning machine, an ultrasonic wave device, and the like), a navigation device, a global positioning system (GPS) a receiver, an event data recorder (EDR), a flight data recorder (FDR), a set-top box, a TV box (for example, Samsung HomeSync®, Apple TV®, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that an electronic device according to the disclosure is not limited to the aforementioned devices.

FIG. 1 is a block diagram of an electronic device 101 in a network environment 100 according to an embodiment of the disclosure.

Referring to FIG. 1, the electronic device 101 may include a bus 110, a processor (e.g., including processing circuitry) 120, a memory 130, an input/output interface (e.g., including interface circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication interface 170, and the like) through the bus 110, interpret the received commands, and execute a calculation or process data according to the interpreted commands. Although illustrated as one element, the processor 120 may include multiple processors and/or cores without departing from the scope and spirit of the disclosure. The processor 120 may include various processing circuitry, including a microprocessor or any suitable type of processing circuitry, such as, for example, and without limitation, one or more central processing units (CPUs), general-purpose processors (e.g., advanced reduced instruction set (RISC) machine (ARM) based processors), a digital signal processor (DSP), a programmable logic device (PLD), an application-specific integrated circuit (ASIC), a field-programmable gate array (FPGA), a graphics processing unit (GPU), a video card controller, etc. Any of the functions and steps provided in the accompanying drawings may be implemented in hardware, software or a combination of both and may be performed in whole or in part within the programmed instructions of a computer. In addition, one of ordinary skill in the art may understand and appreciate that a processor or a microprocessor may be hardware in the disclosure.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from the application 147 and/or the middleware 143, for example, may perform load balancing of the work requests by using a method of assigning a priority, in which system resources (e.g., the bus 110, the processor 120, the memory 130, and the like) of the electronic device 101 can be used, to the application 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 101. The communication interface 170 may support a short-range communication protocol (e.g., Wi-Fi, Bluetooth (BT), and near field communication (NFC)), or a network communication (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., is of an identical type) to or different (e.g., is of a different type) from the electronic device 101. Further, the communication interface 170 may enable communication between a server 106 and the electronic device 101 via a network 162. Additionally, the communication interface 170 may establish a short-range wireless communication connection 164 between the electronic device 101 and any other electronic device (e.g., electronic device 102).

Figure 2:
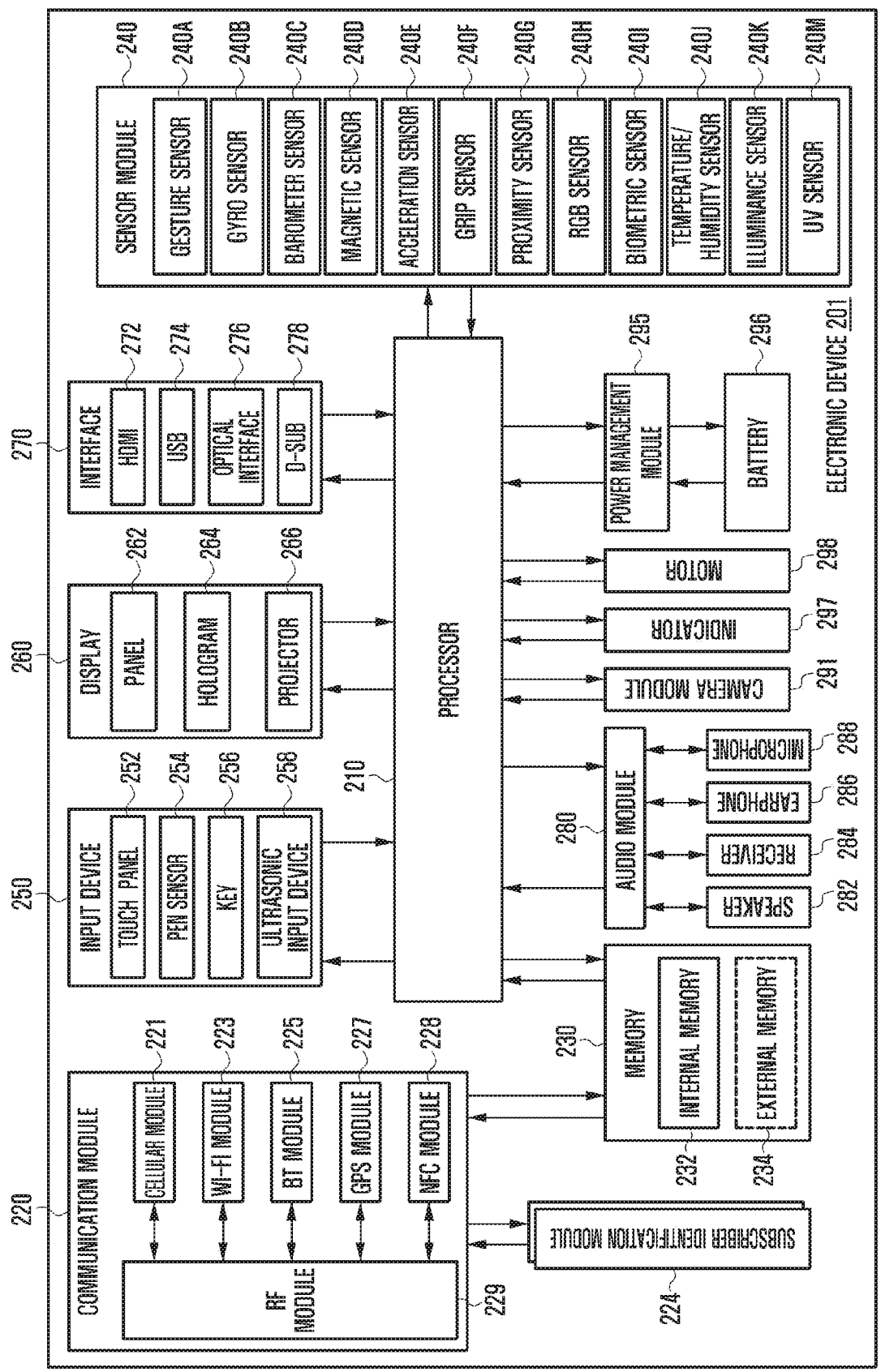
FIG. 2 is a block diagram of the electronic device according to various embodiments of the disclosure.

FIG. 2 is a block diagram of an electronic device 201 according to an embodiment of the disclosure.

Referring to FIG. 2, the electronic device 201 may include a processor (e.g., and application processor (AP) including processing circuitry) 210, a subscriber identification module (SIM) card 224, a memory 230, a communication module (e.g., including communication circuitry) 220, a sensor module 240, an input device (e.g., including input circuitry) 250, a display 260, an interface (e.g., including interface circuitry) 270, an audio module (e.g., including a coder/decoder (codec)) 280, a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, APs, and one or more communication processors (CPs). The processor 210 may be, for example, the processor 120 illustrated in FIG. 1. The AP and the CP may be included in the processor 210 in FIG. 2, or may be included in different integrated circuit (IC) packages, respectively. According to an embodiment of the disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the disclosure, the processor 210 may further include a GPU.

The CP may manage a data line and may convert a communication protocol in the case of communication between the electronic device (e.g., the electronic device 101) including the electronic device 201 and different electronic devices connected to the electronic device through the network. The CP may be implemented by, for example, an SoC. According to an embodiment of the disclosure, the CP may perform at least some of multimedia control functions. The CP, for example, may distinguish and authenticate a terminal in a communication network using a SIM (e.g., the SIM 224). In addition, the CP may provide a user with services, such as a voice telephony call, a video telephony call, a text message, packet data, and the like.

Further, the CP may control the transmission and reception of data by the communication module 220. In FIG. 2, the elements, such as the power management module 295, the memory 230, and the like are illustrated as elements separate from the processor 210. However, according to an embodiment of the disclosure, the processor 210 may include at least some of the above-described elements (e.g., the power management module 295).

According to an embodiment of the disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM 224 may be a card implementing a SIM, and may be inserted into a slot formed in a particular portion of the electronic device 201. The SIM 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NOT AND (NAND) flash memory, a NOT OR (NOR) flash memory, and the like). According to an embodiment of the disclosure, the internal memory 232 may be in the form of a solid-state drive (SSD). The external memory 234 may further include a flash drive, for example, a compact flash (CF) drive, a secure digital (SD) drive, a micro-SD drive, a mini-SD drive, an extreme digital (xD) drive, a memory stick, and the like.

The communication module 220 may include various communication circuitry including, for example, and without limitation, a radio frequency (RF) module 229. The communication module 220 may be, for example, the communication interface 170 illustrated in FIG. 1. The communication module 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, and an NFC module 228. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like).

The communication module 220 may perform data communication with the electronic devices 102 and 104, and the server 106 through the network 162.

The RF module 229 may be used for transmission and reception of data, for example, transmission and reception of RF signals or called electronic signals. The RF unit 229 may include, for example, a transceiver, a power amplifier module (PAM), a frequency filter, a low noise amplifier (LNA), and the like. In addition, the RF module 229 may further include a component for transmitting and receiving electromagnetic waves in free space in a wireless communication, for example, a conductor, a conductive wire, and the like.

The sensor module 240 may include, for example, at least one of a gesture sensor 240A, a gyro sensor 240 B, a barometer (e.g., atmospheric pressure) sensor 240C, a magnetic sensor 240D, an acceleration sensor 240E, a grip sensor 240F, a proximity sensor 240G, a red, green and blue (RGB) sensor 240H, a biometric (e.g., bio) sensor 240I, a temperature/humidity sensor 240J, an illumination (e.g., light) sensor 240K, and an ultra violet (UV) light sensor 240M. The sensor module 240 may measure a physical quantity or detect an operating state of the electronic device 201, and convert the measured or detected information into an electrical signal. Additionally/alternatively, the sensor module 240 may include, for example, an electronic nose (E-nose) sensor, an electromyography (EMG) sensor, an electroencephalogram (EEG) sensor, an electrocardiogram (ECG) sensor, a fingerprint sensor, and the like. The sensor module 240 may further include a control circuit for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), a key 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller. In the capacitive type, the touch panel 252 is capable of recognizing a proximity touch as well as a direct touch. The touch panel 252 may further include a tactile layer. In this event, the touch panel 252 may provide a tactile response to a user.

The pen sensor 254 (e.g., a digital pen sensor), for example, may be implemented by using a method identical or similar to a method of receiving a touch input from a user, or by using a separate sheet for recognition. For example, a key pad or a touch key may be used as the key 256. The ultrasonic input device 258 enables the electronic device 201 to detect a sound wave by using a microphone 288 of the electronic device 201 through a pen generating an ultrasonic signal, and identify data. The ultrasonic input device 258 is capable of wireless recognition. According to an embodiment of the disclosure, the electronic device 201 may receive a user input from an external device (e.g., a network, a computer, or a server), which is connected to the electronic device 201, through the communication module 220.

The display 260 may include a panel 262, a hologram 264, and a projector 266. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light onto external surfaces. According to an embodiment of the disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) connector 278. Additionally or alternatively, the interface 270 may include, for example, an SD/multi-media card (MMC) or an interface according to a standard of the infrared data association (IrDA).

The audio module (e.g., including a codec) 280 may bidirectionally convert between an audio signal (e.g., a voice signal) and an electrical signal. The audio module 280 may convert voice information, which is input to or output from the audio module 280 through, for example, a speaker 282, a receiver 284, an earphone 286, the microphone 288, and the like.

The camera module 291 may capture a still image and a moving image. According to an embodiment of the disclosure, the camera module 291 may include one or more image sensors (e.g., a front lens or a back lens), an image signal processor (ISP), and a flash LED.

The power management module 295 may manage power of the electronic device 201. The power management module 295 may include, for example, a power management IC (PMIC), a charger IC, or a battery gauge. The PMIC may be mounted to, for example, an IC or an SoC semiconductor. Charging methods may be classified into a wired charging method and a wireless charging method. A charger IC may charge a battery, and prevent an overvoltage or an overcurrent between a charger and the battery. According to an embodiment of the disclosure, the charger IC may provide at least one of a wired charging method and a wireless charging method. Examples of a wireless charging method may include a magnetic resonance method, a magnetic induction method, an electromagnetic method, and the like. Additional circuits (e.g., a coil loop, a resonance circuit, a rectifier, and the like) for wireless charging may be added in order to perform wireless charging.

The battery gauge may measure, for example, a residual quantity of the battery 296, a voltage, a current or a temperature during charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

The electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), MediaFlow®, and the like.

Each of the above-described elements of the electronic device 201 according to an embodiment of the disclosure may include one or more components, and the names of the elements may change depending on the type of the electronic device 201. The electronic device 201 may include at least one of the above-described elements. Some of the above-described elements may be omitted from the electronic device 201, or the electronic device 201 may further include additional elements. In addition, some of the elements of the electronic device 201 may be combined into one entity, which may perform functions identical to those of the relevant elements before the combination.

The term "module" used in the disclosure may refer to, for example, a unit including one or more combinations of hardware, software, and firmware. The term "module" may be interchangeably used with the terms "unit," "logic," "logical block," "component," "circuit," and the like. The term "module" may indicate a minimum unit of a component formed as one body or a part thereof The term "module" may indicate a minimum unit for performing one or more functions or a part thereof The term "module" may indicate a unit that is implemented mechanically or electronically. For example, and without limitation, the term "module" according to an embodiment of the disclosure may refer to a unit that includes at least one of a dedicated processor, a CPU, an ASIC, an FPGA, and a programmable-logic device for performing certain operations which are known or will be developed in the future.

Figure 3:
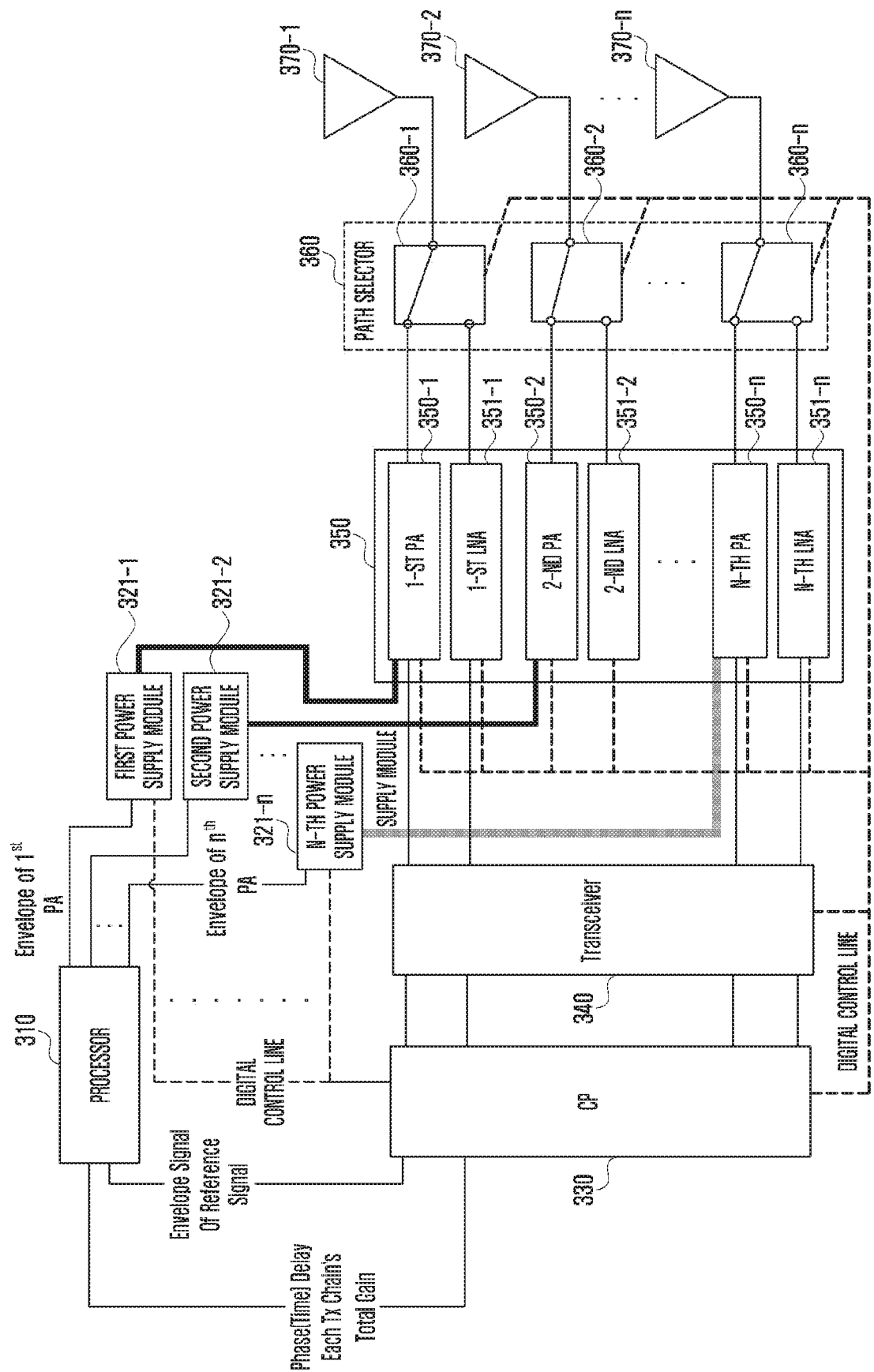
FIG. 3 is a block diagram of the electronic device according to various embodiments of the disclosure.

FIG. 3 is a block diagram of the electronic device according to various embodiments of the disclosure.

Referring to FIG. 3, an electronic device according to various embodiments of the disclosure includes a processor 310, at least one power supply module 321-1 to 321-n, a communication processor 330, a transceiver 340, a plurality of amplifiers 350, a plurality of switches 360, and antennas 370-1 to 370-n. According to various embodiments of the disclosure, the processor 310 may be an application processor (AP). According to another embodiment of the disclosure, the processor 310 may be implemented in the communications processor 330.

An electronic device 300 (e.g., electronic device 101 or electronic device 201) in accordance with various embodiments of the disclosure may be configured to support a beamforming technology in transmitting and receiving a signal for communication. The electronic device according to various embodiments of the disclosure may include a plurality of antennas 370-1 to 370-n. The beamforming may be a technology for controlling signals output from each of the plurality of antennas 370-1 to 370-n to be transmitted to the same destination.

According to various embodiments of the disclosure, the communication processor 330 (e.g., processor 210 or communication module 220) may set a signal output by one of the plurality of antennas as a reference signal. According to various embodiments of the disclosure, the communication processor 330 may set the signal output from the first antenna 370-1 as the reference signal. The communication processor 330 may transmit the amplitude information of the reference signal to the processor 310. According to various embodiments of the disclosure, the amplitude information may include envelope information of the reference signal. In addition, the amplitude information may include information on average amplitude of the reference signal over a predetermined time period.

For convenience of explanation, the signal output from the first antenna 370-1 is defined as a first signal, and the signal output from the second antenna 370-2 is defined as a second signal. Hereinafter, the case where the first signal is defined as the reference signal will be described as an example.

In performing the beamforming, the communication processor (CP) 330 according to various embodiments may calculate the delay time of the signal based on the direction (or angle between the virtual line parallel with the direction in which the signals forming the beam are transmitted and the virtual line including the antennas) in which the beams from the plurality of antennas are formed and the physically spaced distance between the antennas. The delay time of the signal will be described in detail with reference to FIG. 4A. The communication processor 330 may transmit the calculated delay time of the signal to the processor 310 based on the direction in which the signals are transmitted.

The communication processor 330 according to various embodiments of the disclosure may calculate a total gain or transmit power of the transmitter and a total gain or receive power of the receiver for performing the beamforming, and transmit a total gain (or transmit power) of the transmitter and a total gain of the receiver (or receive power) to the processor 310 (e.g., processor 210). According to various embodiments of the disclosure, each gain may refer to a gain for maintaining a signal to noise ratio (SNR) of a specific signal among a plurality of signals according to channel state information to be a threshold value or more or a gain for increasing the SNR of the signal corresponding to a path with severe interference among multipaths.

A plurality of power supply modules 321-1 to 321-n according to various embodiments may supply power to each of the amplifiers 350. According to various embodiments of the disclosure, the first power supply module 321-1 may control power transmitted to the first amplifier 350-1 based on first power control information transmitted from the processor 310. In addition, the n-th power supply module 321-n may control power transmitted to the n-th power amplifier 350-n based on the second power control information transmitted from the processor 310. The power control information may refer to information for controlling power that the power supply module (e.g., first power supply module 321-1) transmits to the amplifier (e.g., first amplifier 350-1). According to various embodiments of the disclosure, the power control information may be set differently depending on the amplitude of the envelope. For example, the power control information may be set to increase the power transmitted to the amplifier as the amplitude of the envelope is increased. For example, if the amplitude of the envelope corresponding to the first time is greater than the amplitude of the envelope corresponding to the second time, the processor 310 may generate the power control information so that the power supplied to the amplifier at the first time is greater than the power supplied to the amplifier at the second time.

The plurality of amplifiers 350 may amplify the input signal using the power supplied from the power supply module. The amplified signal may be output through the antenna via a path selector 360. According to various embodiments of the disclosure, the amplifiers 350 may include, for example, an amplifier and a low-noise amplifier corresponding to each of the antennas. Referring to FIG. 3, a first amplifier 350-1 and a first low-noise amplifier 351-1 corresponding to the first antenna 370-1 are illustrated. The first amplifier 350-1 may amplify the signal output using the first antenna 370-1. The first low-noise amplifier 351-1 may amplify the signal received by the first antenna 370-1. According to various embodiments of the disclosure, the signal received by the low-noise amplifier in the receiving circuit may be amplified to generate the signal whose noise is reduced.

A transceiver 340 according to various embodiments of the disclosure includes the plurality of amplifiers 350, the path selector 360, and the antennas 370-1 to 370-n to transmit/receive a signal using at least one antenna connected to the transceiver 340. In addition, the transceiver 340 may also process the transmitted/received signal. A detailed description of the transceiver 340 is described with reference to FIG. 11.

According to various embodiments of the disclosure, the path selector 360 may include switches 360-1 to 360-n corresponding to each of the antennas. Each of the switches may be connected to the amplifier 350. For example, the first switch 360-1 may connect either the first amplifier 350-1 or the first low-noise amplifier 351-1 to the antenna 370-1 according to the transmission/reception of the signal based on the control signal received from the processor 310 or the communication processor 330.

The processor 310 may generate the first power control information based at least in part on the amplitude information of the reference signal. The first power control information may refer to the information for controlling power to the first amplifier 350-1 transmitting the power to the first antenna 370-1 that outputs the first signal. The processor 310 may control the first power supply module 321-1 that controls the power supplied to the first amplifier 350-1 that amplifies the first signal, based at least in part on the first power information. The first power supply module 321-1 may supply power to the first amplifier 350-1 based on the control signal of the processor 310. The first amplifier 350-1 may output the first signal through the first antenna 370-1 based on the power supplied from the first power supply module 321.

According to various embodiments of the disclosure, the processor 310 may generate the envelope information of the first signal using the amplitude information of the first signal, and the processor 310 may generate the first power control information to correspond to the generated envelope information. The envelope can refer to a curve tangent to all of curves of a signal when the signal is plotted on a graph with respect to a particular axis (e.g., time axis). According to various embodiments of the disclosure, the envelope signal may refer to a signal composed of curves tangent to all of the curves with regularity included in the signal. The envelope information may refer to information including the amplitude, phase, etc. of the envelope signal. According to another embodiment of the disclosure, the processor 310 may confirm the average amplitude of the first signal over the predetermined time period using the amplitude information of the first signal. The processor 310 may generate the first power control information corresponding to the confirmed average amplitude. The above embodiment will be described in detail with reference to FIGS. 7A to 7C.

The processor 310 may generate the second power control information based at least in part on the first power control information and a delay time of the second signal with respect to the first signal. The delay time of the second signal with respect to the first signal may be related to the direction in which the signals configuring the beam are transmitted in performing the beamforming The relationship between the delay time and the direction in which the signal is transmitted will be described with reference to FIGS. 4A and 4B. The processor 310 may control the second power supply module 321-2 that controls the power supplied to the second amplifier 350-2 that amplifies the second signal, based at least in part on the second power information. The second power supply module 321-2 may supply power to the second amplifier 350-2 based on the control signal of the processor 310. The second amplifier 350-2 may output the second signal through the second antenna 370-2 based on the power supplied from the second power supply module 321.

Although the case where the number of power supply modules are plural is described for example, the number of power supply modules may be one, and the operation of the processor 310 when the number of power supply modules is one will be described with reference to FIGS. 9A and 9 B. In addition, although the processor 310 is described as generating the power control information, according to various embodiments of the disclosure, the processor 310 may also generate the control information on the voltage that the power supply module supplies.

According to various embodiments of the disclosure, the processor 310 may generate a plurality of signals using one reference signal and the delay information (time or phase). The plurality of generated signals may be radiated using each of the antennas performing the beamforming Therefore, the electronic device according to various embodiments of the disclosure may perform the beamforming by generating the plurality of signals using the delay information according to a progress angle of the signals included in one reference signal and the beam without confirming all the signal information including the amplitude, the phase, etc. of the plurality of signals. According to various embodiments of the disclosure, the processor 310 may perform at least some of the functions that the communication processor 330 provides.

According to various embodiments, the processor 310 may be implemented within either communication processor 330 or an AP (not illustrated). In addition, the processor 310 may be implemented as a separate processor from the communication processor 330, as illustrated in FIG. 3. The processor 310 may be implemented as a low power processor. In addition, the processor 310 may be implemented as the processor in the power control module that controls the power supply module.

Figure 4A:
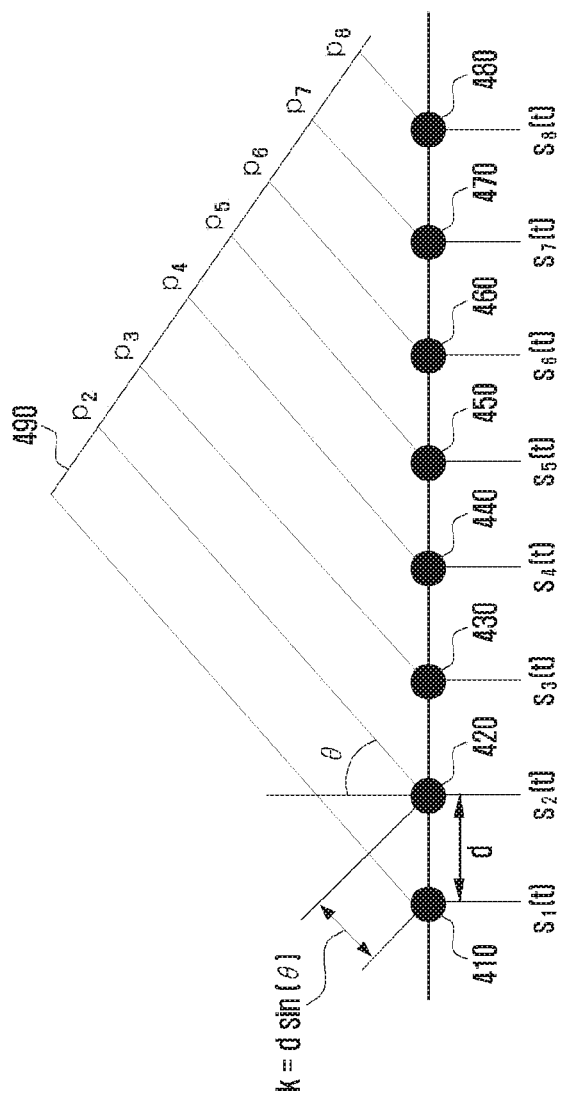
FIG. 4A is a diagram illustrating an antenna for performing beamforming and a path of a signal output from the antenna in the electronic device according to various embodiments of the disclosure.

FIG. 4A is a diagram illustrating a path of a signal output by the plurality of antennas performing the beamforming and the paths of the signals output from the antennas, in the electronic device according to various embodiments of the disclosure.

Figure 4B:
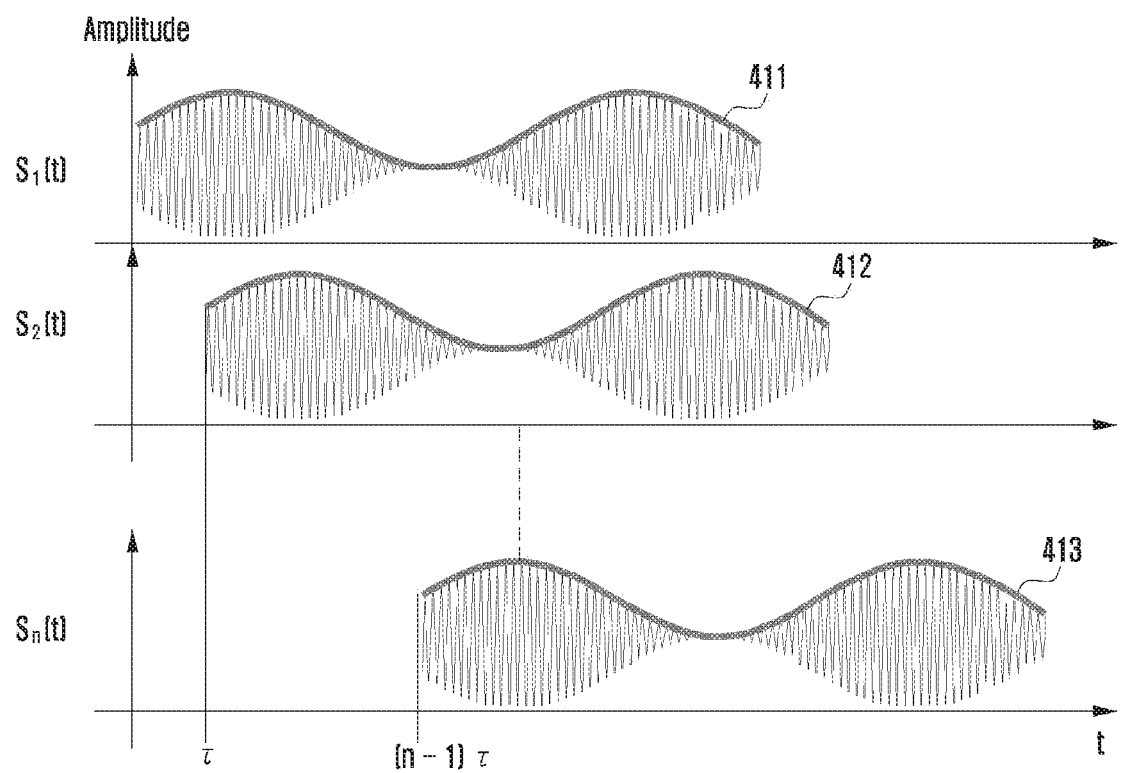
FIG. 4B is a diagram illustrating signals output from the antennas in the electronic device according to various embodiments of the disclosure.

FIG. 4B is a diagram illustrating the signals output from the antennas in the electronic device according to various embodiments of the disclosure. The contents that the processor 310 uses the envelope information and the phase delay information of the reference signal (e.g., a first signal) to control the signals output from the plurality of antennas and the power supply module (e.g., power supply modules 321-1, 321-2, and 321-n) will be described with reference to FIGS. 4A and 4B.

Referring to FIG. 4A, the processor 310 (e.g., the processor 110) controls the phases of the signals to be equal when the signals output from the antennas 410 to 480 reach a virtual destination 490. The smaller the difference in the phase of each of the signals, the higher the degree to which the signals cause constructive interference. That is, in performing the beamforming, it is possible to increase the transmission efficiency of signals by controlling the difference in the phase of the signals arriving at the destination to be minimized.

For this purpose, the processor 310 may calculate, for example, a difference (k=d*sin(θ)) between a travel distance until the first signal output from the first antenna 410 (e.g., first antenna 370-1) reaches the destination 490 and a travel distance until the second signal output from the second antenna 420 (e.g., second antenna 370-2) reaches the destination 490. The processor 310 may generate the envelope of the second signal delayed by the delay time corresponding to the difference of the calculated travel distance in the envelope of the first signal. θ may refer to the angle that represents the direction in which the signal is transmitted. According to the direction in which the signal is transmitted, the value of θ may also vary.

Referring to FIG. 4A, a difference between a propagation distances of the first signal and the second signal may be d*sin(θ). In addition, the delay time may mean the following Equation 1, which is a value obtained by dividing the signal speed (c=3*10^8 m/s)) by the difference in travel distance.

$$\text{Delay Time } \tau = \frac{d\sin(\theta)}{c} \quad \text{Equation 1}$$

Referring to the above Equation 1, it can be confirmed that the delay time may be changed according to the propagation direction of the signal.

According to another embodiment of the disclosure, the processor 310 may compare the phase of the signal output from the second antenna 420 with the phase of the signal output from the first antenna 410 to control the second power supply module 321-2 to be delayed by the phase corresponding to the difference in the travel distance Similar to the above description, the phase of the signal output from the third antenna 430 is compared with the phase of the signal output from the second antennal 420 to control the third power supply module (not illustrated) to be delayed by the phase corresponding to the difference in the travel distance between the second signal and the third signal.

In addition, the phase delay may be determined using the following Equation 2.

$$\text{Phase Delay} = \frac{2\pi f d \sin(\theta)}{c} = 2\pi f \tau. \qquad \text{Equation 2}$$

Referring to FIG. 4B, it can be confirmed that the first signal 411 and the second signal 412 are signals having the same envelope. It can be confirmed that the second signal 412 has the time delay by τ compared to the first signal 411. For example, when the interval between the antennas is constant at 'd', as described above, the difference between the propagation distances of third signal and the third signal may be d *sin(θ). Since the difference between the propagation distances of the first signal and the second signal is equal to the difference between the propagation distances of the second signal and the third signal, it can be confirmed that the third signal (not illustrated) may have the time delay by τ compared to the second signal and the n-th signal 413 is a signal having the time delay by (n−1)τ compared to the first signal 411. By using the method described with reference to FIGS. 4A and 4B, the processor 310 may delay the phases of the signals output from the respective antennas by the time (or phase) corresponding to the difference in the travel distance to control the difference between the respective phases when the signals reach the destination 490 to be minimized.

According to various embodiments of the disclosure, the processor 310 may also apply as the delay time the first delay time for beamforming the first signal and the second signal in a first direction or the second delay time for beamforming them in a second direction. The processor 310 may change the delay time as the travel direction θ of the signals is changed.

FIG. 5 is a block diagram of the processor 310, in the electronic device according to various embodiments of the disclosure.

The processor 310 (e.g., processor 110 or communications processor 330) included in the electronic device according to various embodiments of the disclosure includes a splitter 311, a delay time multiplier 312, a plurality of phase shifters 313-1 to 313-n, a plurality of amplifiers 315-1 to 315-n, and a gain controller 314. In FIG. 5, the control of the processor 310 will be described in detail when the electronic device performs the beamforming using n antennas.

The splitter 311 may divide the reference signal (first signal) transmitted from the communication processor 330 into n number. The n signals generated by the splitter 311 may be the same signal as the reference signal. According to various embodiments of the disclosure, an amplifier for amplifying a split signal may be additionally included in the splitter 311 in order to compensate for a loss (e.g., magnitude of a signal, etc.) occurring at the time of the splitting of the signal. According to another embodiment of the disclosure, the splitter 311 may be implemented as a signal duplication circuit that duplicates the reference signal in n number.

The delay time multiplier 312 may receive phase delay information or delay time information transmitted from the communication processor 330. As described above with reference to FIGS. 4A and 4B, the phase delay information or the delay time information may refer to the information related to the direction in which the signal is progressed in performing the beamforming. The delay time multiplier 312 may control each of the phase shifters 313-1 to 313-n, which change each of the phases of the signals output from the respective antennas, based on the phase delay information (or delay time information). For example, the delay time multiplier 312 may control the n-th phase shifter 313-n to delay the input signal by the time of (n-1). τ+1. As another example, the delay time multiplier 312 may control the n-th phase shifter 313-n to delay the input signal by the time of (n−1)τ+k may refer to a value correcting an error that may occur due to the circuit design/environment or the like.

Each of the phase shifters 313-1 to 313-n may delay the phases of the reference signals transmitted from the splitter 311 based on the control signal of the delay time multiplier 312.

The gain controller 314 may receive gain values for each signal from the communication processor 330 in performing the beamforming The gain controller 314 may control the amplifiers 315-1 to 315-n based on the gain values received from the communication processor 330. According to various embodiments of the disclosure, the gain controller 314 may be implemented in the power supplies 321 and 322, rather than the processor 310.

The amplifiers 315-1 to 315-n may amplify the signals output from each of the phase shifters 313-1 to 313-n based on the control signal associated with the gain value of the gain controller 314. The amplified signals are transmitted to a power supplier, and the power supplier may supply voltage to the amplifiers 350 to control the antennas to perform the beamforming According to an embodiment of the disclosure, the reference signal input to the splitter 311 is an analog signal, and the phase delay information input to the delay time multiplier 312 and the gain information input to the gain controller 314 may be implemented as a digital signal. The delay time multiplier 312 and the gain controller 314 may be implemented as an analog circuit that receives a control in a digital scheme, and the envelope signals corresponding to each of the signals output from each of the amplifiers 315-1 to 315-n may be an analog signal.

According to another embodiment of the disclosure, the reference signal input to the splitter 311 is a digital signal, and the phase delay information input to the delay time multiplier 312 and the gain information input to the gain controller 314 may be implemented as a digital signal. In this case, when the power suppliers 321-1 to and 321-n are capable of analog signal processing, ends of each of the amplifiers 315-1 to 315-n are provided with digital-to-analog converters (DACs), and each of the amplifiers 315-1 to 315-n may perform a control to output an analog signal. If the power suppliers 321 to 322 are capable of digital signal processing, they may not include a DAC. As described above, it is possible to include a DAC or an analog-to-digital converter (ADC) at an input end or an output end, taking into account characteristics (e.g., analog or digital) of the signal that each component may support.

The processor 310 illustrated in FIG. 5 may be included within the communication processor 330 or an RFIC stage.

Figure 6:
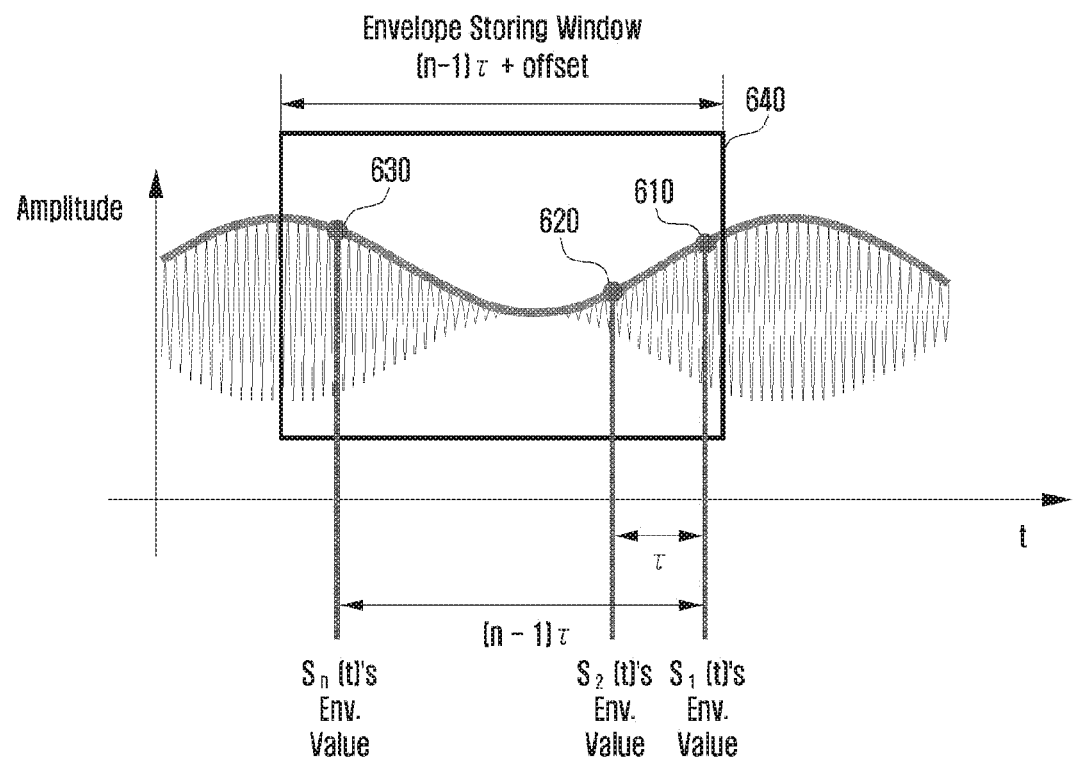
FIG. 6 is a diagram illustrating extracting a reference signal and an antenna signal value, in the electronic device according to various embodiments of the disclosure.

FIG. 6 is a diagram illustrating extracting a reference signal and an antenna signal value, in the electronic device according to various embodiments of the disclosure.

The contents that when the reference signal (e.g., signal output from the first antenna), the magnitude of the signal output from each of the antennas is the digital signal are described. The processor 310 of the electronic device according to various embodiments of the disclosure may store a portion of the reference signal in a memory (or buffer implemented in the communications processor 330). A portion of the stored reference signal may be used to generate the signals that perform the beamforming Referring to FIG. 6, the magnitude of the signal output from the first antenna at a specific time may refer to a Y-axis value 610. The magnitude of the signal output from the second antenna may refer to a Y-axis value 620. An X-axis value 620 may be smaller by $(n-1)\tau$ than an X-axis value 610. This may mean that the signal output from the second antenna is delayed by $(n-1)\tau$ than the signal output from the first antenna. Also, the magnitude of the signal output from the n-th antenna may refer to the Y-axis value 630. An X-axis value 630 may be smaller by $(n-1)\tau$ than an X-axis value 610. This may mean that the signal output from the n-th antenna is delayed by $(n-1)\tau$ than the signal output from the first antenna.

Some of the reference signals stored in the memory (or buffer implemented in the communications processor 330) of the processor 310 according to various embodiments may have a magnitude greater than the maximum delay time $(n-1)\tau$ The maximum delay time may refer to a delay time when the angle of the direction in which the signal output from the antenna is formed is maximum. The processor 310 may generate the envelope information of signals output from each of the antennas using a part of the reference signal stored in the memory and the delay time.

Figure 7A:
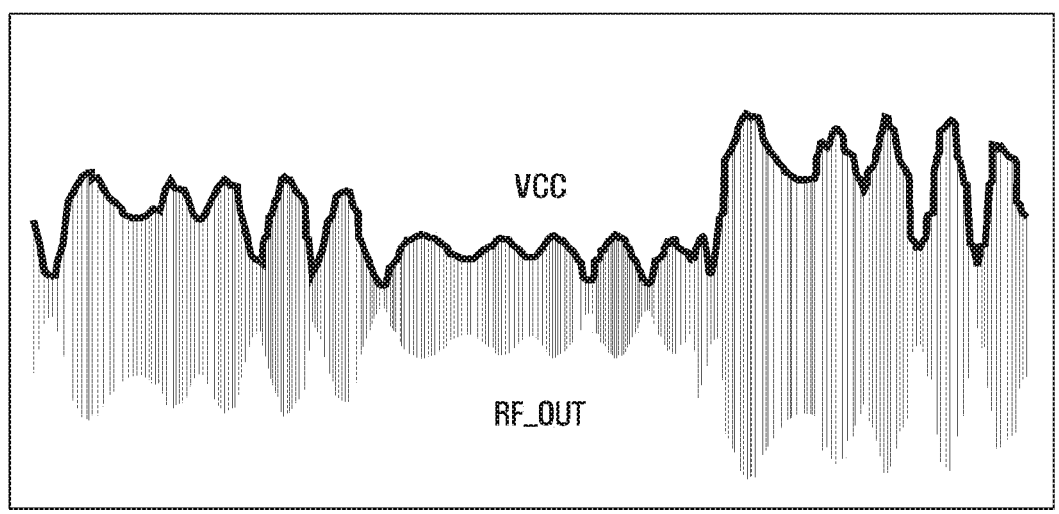
FIGS. 7A, 7B, and 7C illustrate a method of supplying power to a plurality of amplifiers in the electronic device according to various embodiments of the disclosure.
Figure 7B:
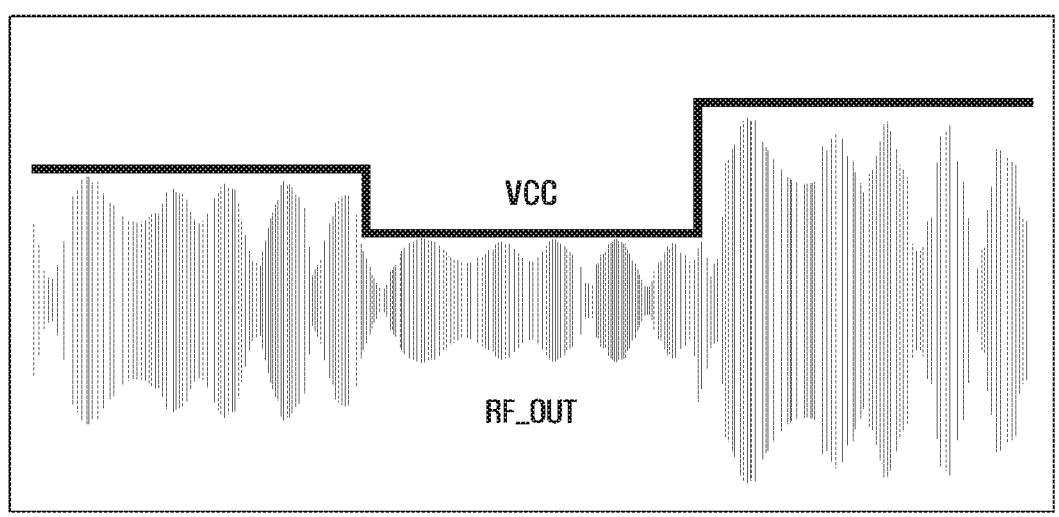
Figure 7C:
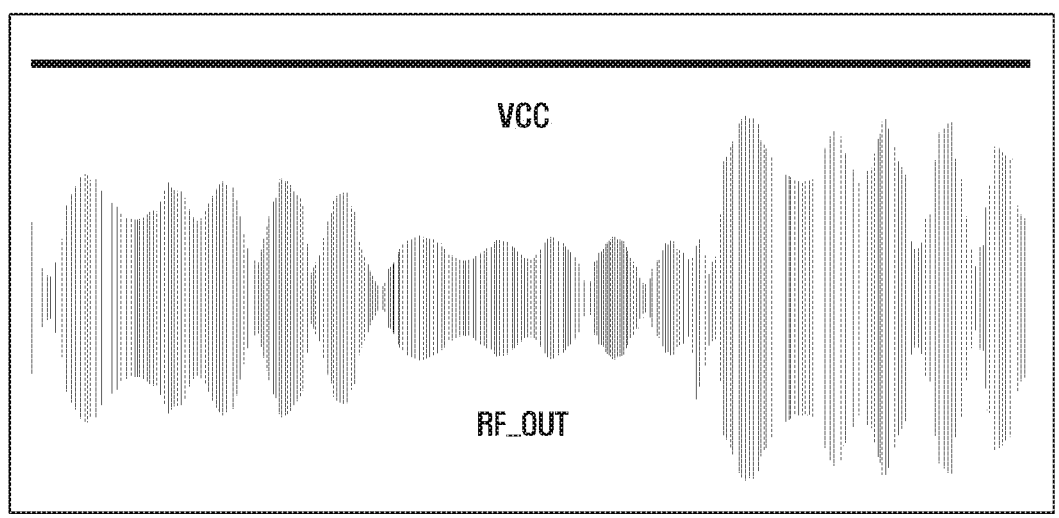

FIGS. 7A, 7B, and 7C illustrate a method of supplying power to a plurality of amplifiers in the electronic device according to various embodiments of the disclosure.

FIG. 7A is a diagram illustrating a method of supplying power to a plurality of amplifiers using an envelope tracking mode.

The envelope tracking mode according to various embodiments may refer to a mode in which the envelope of the reference signal is tracked in real time to supply power to a plurality of amplifiers based on instantaneous amplitude information (which may include a real time change of the envelope) of the signal. The envelope tracking mode is a mode for controlling a power supply according to an envelope of a transmission signal and may have an advantage of increasing the power utilization efficiency by supplying power according to the instantaneous amplitude information of the signal. On the other hand, additional power may be required due to the operation of changing the voltage depending on the envelope change (e.g., the amplitude of the envelope) of the transmission signal, so that the power generation efficiency may be relatively low.

FIG. 7B is a diagram illustrating a method of supplying power to a plurality of amplifiers using an average power tracking (APT) mode. The APT mode according to various embodiments may refer to a mode of supplying power to a plurality of amplifiers based on an average voltage or power of a reference signal. The average voltage or the power of the reference signal may be determined based on an average voltage or power of a specified time interval (e.g., the average voltage or the power of the reference signal may be measured every interval set to be 10 ms) of the reference signal. The APT mode according to various embodiments may refer to a mode of supplying power to a plurality of amplifiers based on the average of the power of the reference signal. The APT mode has the power utilization efficiency relatively lower than that of the envelope tracking mode, but may have power generation efficiency higher than that that of the envelope tracking mode.

FIG. 7C is a diagram illustrating a method of supplying power to a plurality of amplifiers using a bypass mode. The bypass mode according to various embodiments may mean a mode of supplying constant power to a plurality of amplifiers regardless of the reference signal. Since the constant power is supplied regardless of the magnitude of the reference signal, the power use efficiency is lower than that of the envelope tracking mode or the APT mode. On the other hand, the power generation efficiency is higher than that of the envelope tracking mode or the APT mode.

The electronic device according to various embodiments of the disclosure may supply power to the plurality of amplifiers by variously using the envelope tracking mode, the APT mode, and the bypass mode according to the magnitude of the reference signal.

FIG. 8 is a diagram illustrating generating the signal using the APT mode illustrated in FIG. 7B according to an embodiment of the disclosure.

Referring to FIG. 8, the processor 310 of the electronic device according to various embodiments of the disclosure may generate the signals output from the plurality of antennas based on the average power (or average amplitude) of the reference signal over the specified time period and the delay time information depending on the angle at which the signal is output.

Reference numeral 810 of FIG. 8 illustrates the reference signal output from the first antenna and the average power of the reference signal over the specified time period. The signal output from the n-th antenna and the average power over the specified time period of the signal are illustrated in reference numeral 820. It can be confirmed that the signal illustrated in reference numeral 820, is delayed by $(n-1)\tau$ than the signal illustrated in reference numeral 810. The processor 310 according to various embodiments may generate a plurality of signals using the amplitude information and the delay time of one reference signal. According to various embodiments of the disclosure, the specified time interval may be set to be 0.5 ms/1 ms which is a third-generation partnership project (3GPP) power control slot time.

Figure 9A:
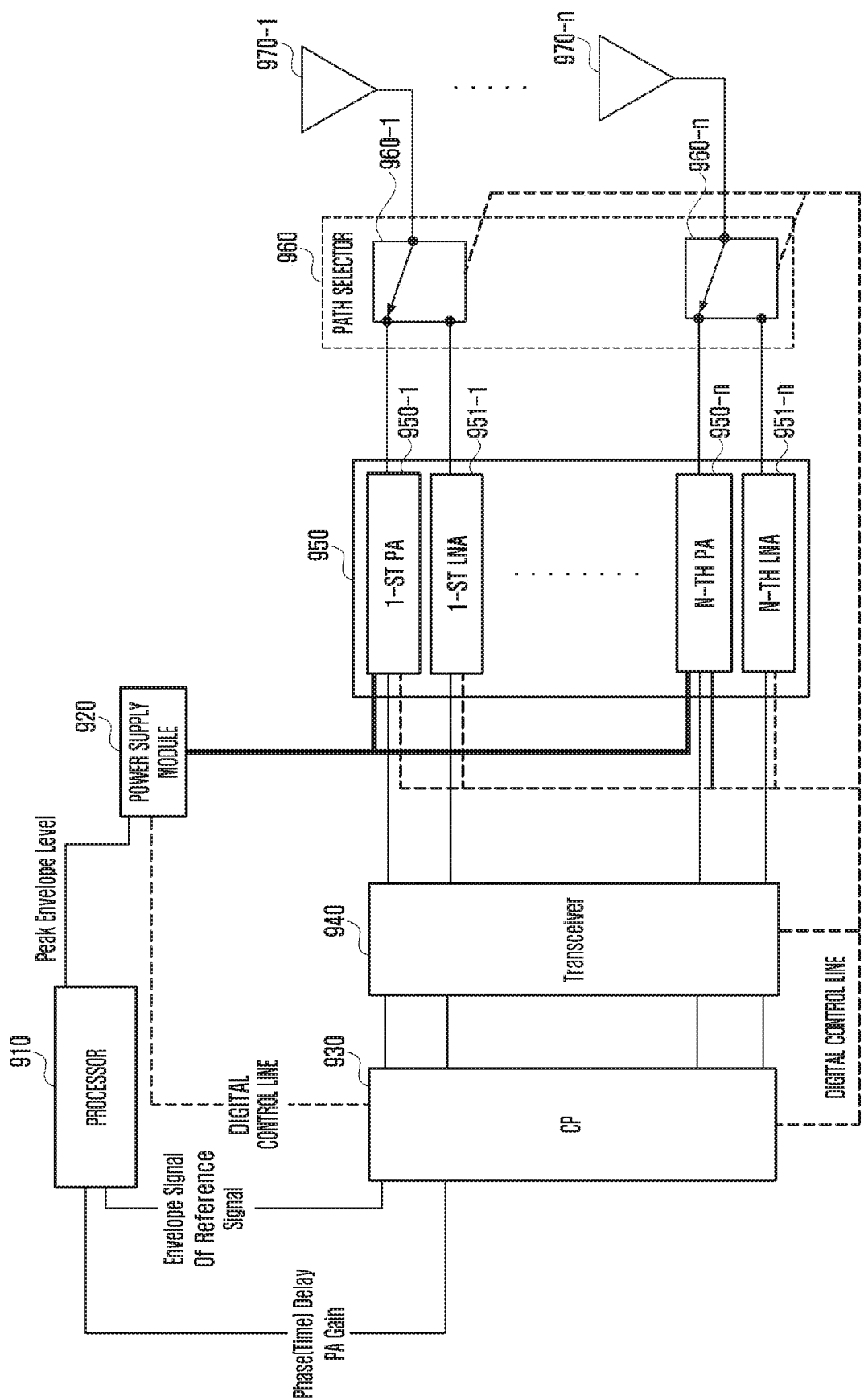
FIG. 9A is a diagram illustrating an electronic device according to various embodiments of the disclosure.

FIG. 9A is a diagram illustrating an electronic device according to another embodiment of the disclosure.

Referring to FIG. 9A, the electronic device (e.g., electronic device 101 and electronic device 201) according to various embodiments of the disclosure includes a processor 910, one power supply module 920, a communication processor 930, a transceiver 940, a plurality of amplifiers 950, a plurality of switches 960, and antennas 970-1 to 970-n.

In the electronic device illustrated in FIG. 3, it can be confirmed that the power supply modules 321 and 322 are arranged in one amplifier one by one. The electronic device illustrated in FIG. 9A differs from the electronic device illustrated in FIG. 3 in that the number of power supply modules 920 is one. The remaining components are the same except for the above differences, and therefore the duplicate descriptions thereof will be omitted.

When there is one power supply module 920, all the power transmitted to the amplifiers connected to each of the plurality of antennas may be the same. Thus, when the number of power supply modules 920 is one, the processor 910 of the electronic device according to various embodiments of the disclosure determines the largest power among power consumed by the plurality of amplifiers per unit time and may transmit the power information corresponding to the largest power to the power supply module 920. The magnitude in the unit time may be changed according to the designer's intention. To this end, the processor 910 may compare the voltage values corresponding to the same time at each of the signals output from each of the antennas, and may transmit the power value corresponding to the largest voltage value to the power supply module 920.

Figure 9B:
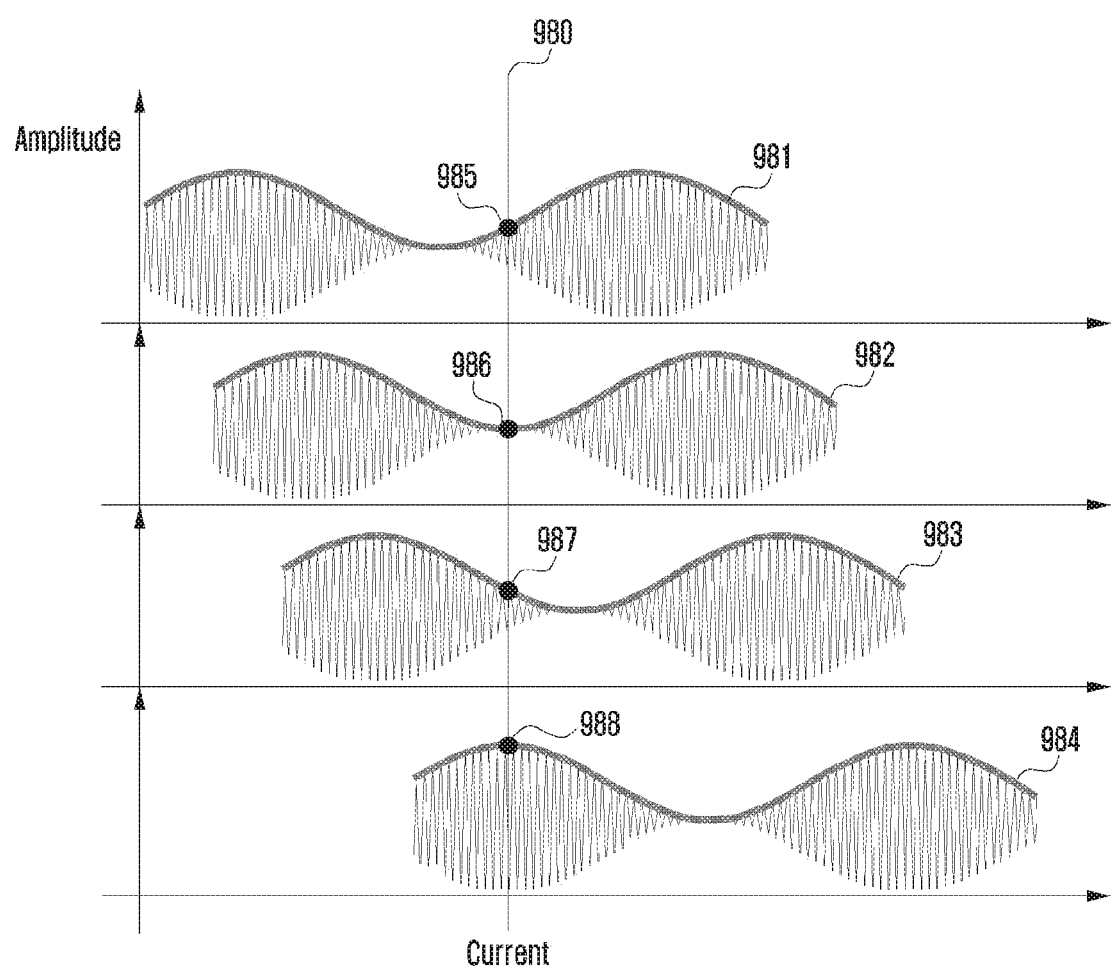
FIG. 9B is a diagram illustrating a method of determining a magnitude of a signal output from a plurality of antennas included in the electronic device illustrated in FIG. 9A according to various embodiments of the disclosure.

FIG. 9B is a diagram illustrating a method of determining a magnitude of a signal output from a plurality of antennas included in the electronic device illustrated in FIG. 9A according to various embodiments of the disclosure.

Referring to FIG. 9B, envelopes 981 to 984 of the signals output from each of the antennas are illustrated. The processor 910 may compare magnitudes 985 to 988 of the signals output from each of the antennas at the same time 980. In FIG. 9B, it can be confirmed that the largest magnitude among the signals output from the antennas at a specific time 980 is 988. The processor 910 may control the power supply module 920 to transmit power corresponding to the Y-axis value (which may mean the voltage magnitude of the signal) corresponding to reference numeral 988 to each of the amplifiers.

The processor 910 of the electronic device according to various embodiments of the disclosure may determine the maximum voltage, as represented in the following Equation 3.

$$V_{envTx} = \max(V_{envTx[1]}, V_{envTx[2]}, \ldots, V_{envTx[n]}) + \text{Offset} \quad \text{Equation 3}$$

The offset may be a constant to ensure the stable operation of the circuit. The processor 910 may determine the maximum voltage, generate power control information corresponding to the maximum voltage, and transmit power control information to the power supply module 920. The power supply module 920 may transit power to the amplifiers 950 based on the power control information. The amplifiers 950 may amplify the signal based on the power transmitted from power supply module 920.

A transceiver 940 (e.g., transceiver 340) according to various embodiments of the disclosure includes the plurality of amplifiers 950, a plurality of switches 960-1 to 960-n included in the path selector 960, and the antennas 970-1 to 970-n to transmit/receive a signal using at least one antenna connected to the transceiver 940. A detailed description of the transceiver 940 is described with reference to FIG. 11.

Figure 10:
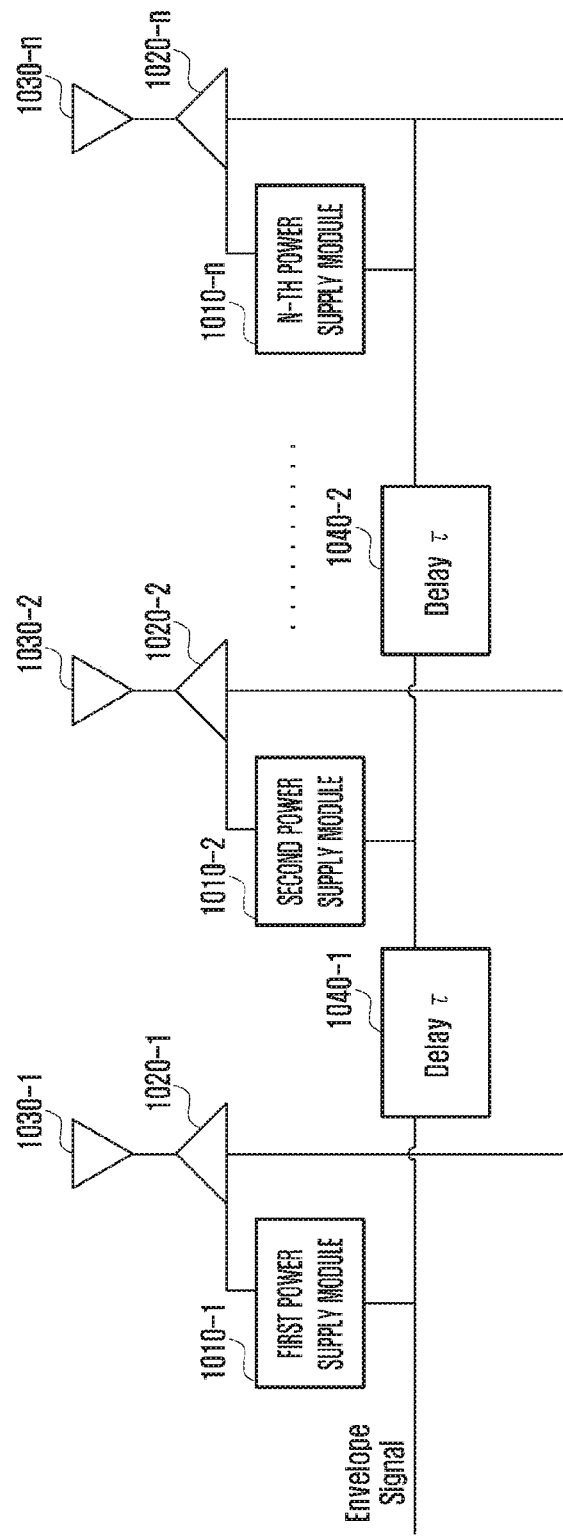
FIG. 10 is a diagram illustrating an electronic device according to various embodiments of the disclosure.

FIG. 10 is a diagram illustrating an electronic device according to another embodiment of the disclosure.

The electronic device (e.g., electronic device 101, electronic device 201) in accordance with various embodiments of the disclosure may generate the envelope (e.g., an envelope of the first signal to an envelope of an n-th signal) information of each of the signals output from the plurality of antennas by using the envelope of one reference signal (e.g., first signal) and the delay time according to the travel direction (e.g., direction in which the first antenna to the n-th antenna are arranged) of the signal output from the antenna. The electronic device illustrated in FIG. 10 also illustrates a circuit for generating the signals output from the plurality of antennas by using one reference signal and the delay time according to the travel direction of the signal output from the antenna.

Referring to FIG. 10, the electronic device (e.g., electronic device 101, electronic device 201) according to various embodiments of the disclosure may include power supply modules 1010-1, 1010-2 to 1010-n, amplifiers 1020-1 to 1020-n, antennas 1030-1 to 1030-n, and delay circuits 1040-1 to 1040-(n−1).

The first power supply module 1010-1 may receive the reference signal, and supply power to the first amplifier 1020-1 based on the envelope information of the reference signal.

The first delay circuit 1040-1 receives the reference signal and generate the envelope signal generated by generating the envelope of the reference signal by the delay time based on the delay time according to the traveling direction of the signals output from the plurality of antennas 1030-1 to 1030-n. As described above, the envelope signal may refer to a signal composed of curves tangent to all of the curves having regularity included in the signal. For example, the envelope signal of the reference signal may refer to a signal composed of curves tangent to all of the curves having regularity included in the reference signal. The envelope information may refer to information including the amplitude, phase, etc. of the envelope signal. The envelope signal generated from the first delay circuit 1040-1 may be a signal generated by delaying the envelope signal generated based on the reference signal by a delay time. According to various embodiments of the disclosure, the first delay circuit 1040-1 may delay the envelope signal of the reference signal by. The first power supply module 1010-1 may supply power to the first amplifier 1020-1 to output the reference signal to the first antenna 1030-1 The second power supply module 1010-2 may supply power to the second amplifier 1020-2 to output the reference signal delayed by τ to the first antenna 1030-2 In this manner, an n−1-th delay circuit may delay the envelope signal of the reference signal by (n−1)τ. The n-th power supply module 1010-n may supply power to the n-th antenna 1030-n based on the power control information corresponding to the envelope delayed by (n−1)τ compared to the envelope of the reference signal.

According to various embodiments of the disclosure, the delay circuits 1040-1 to 1040-(n−1) may further include an amplifier to compensate for attenuation of the signal due to continuous signal transmission, or control and compensate for the gain of the delay circuit.

The amplifiers 1020-2 to 1020-n according to various embodiments may amplify the signal generated from the delay circuit (e.g., first delay circuit 1040-1 connected to the second amplifier 1020-2) corresponding to each of the amplifiers. The power required for the amplifiers to amplify the signals may be supplied to the power supply modules 1010-1 to 1010-n (e.g., the first power supply module 1010-1 may be connected to the first amplifier 1020-1) connected to each of the amplifiers 1020-1 through 1020-n.

Figure 11:
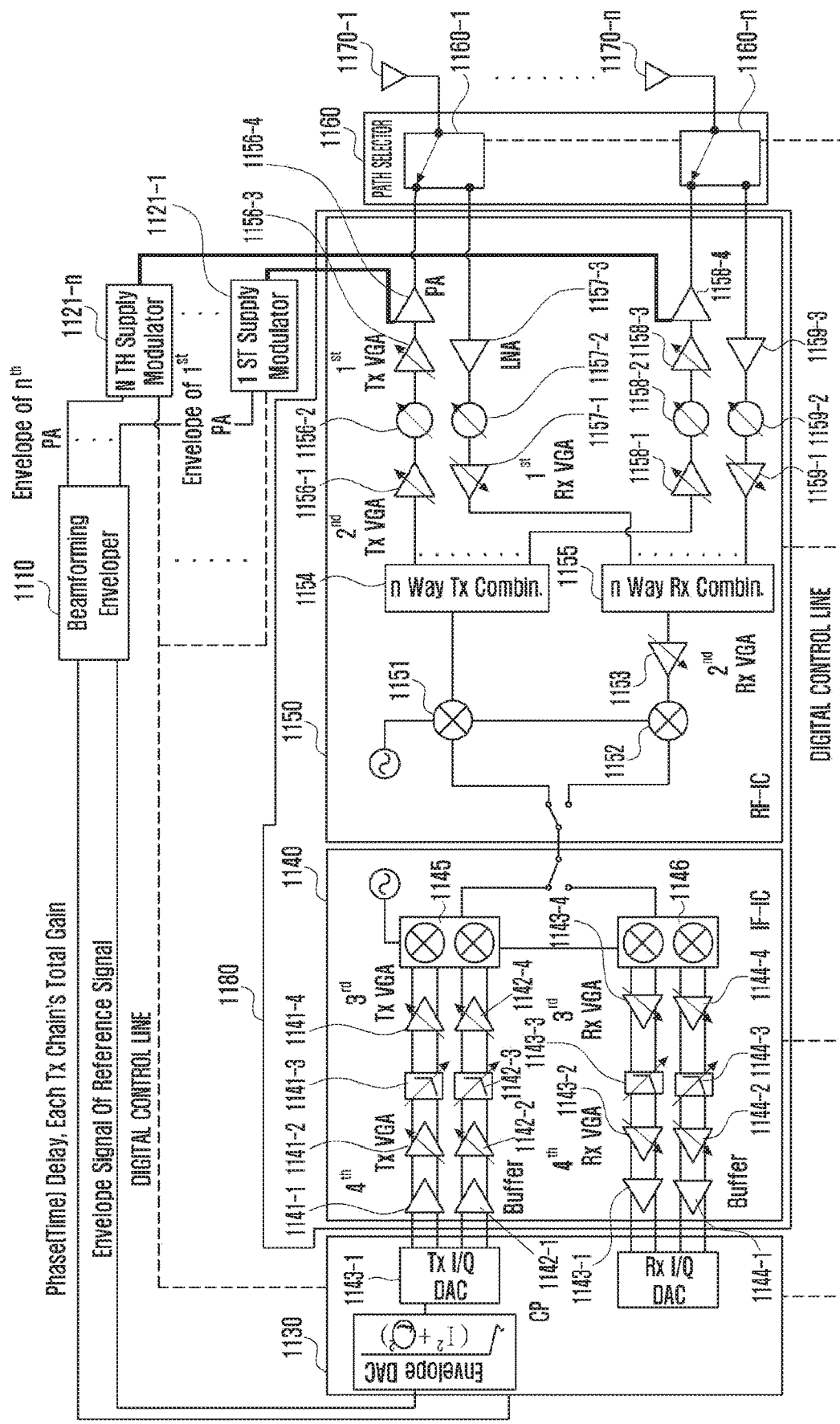
FIG. 11 is a diagram illustrating an electronic device according to various embodiments of the disclosure.

FIG. 11 is a diagram illustrating an electronic device according to another embodiment of the disclosure.

The electronic device according to various embodiments of the disclosure illustrated in FIG. 11 is the electronic device embodying the transceiver 340 included in the electronic device shown in FIG. 3. The description of the same configuration among the contents illustrated in FIG. 3 and the contents illustrated in FIG. 11 will be omitted.

The electronic device illustrated in FIG. 11 may refer to a beamforming communication circuit that has n chains and can process one data stream. A digital signal control line inside the IC is omitted. A digital control line of communication processor 1130/intermediate frequency integrated circuit 1140/radio frequency integrated circuit 1150/switch/supply modulators 1121 to 1122/beamforming enveloper 1110 that are included in the electronic device according to various embodiments of the disclosure may be configured to include mobile industry processor interface (MIPI), inter-integrated circuit) (I2C), peripheral component interconnect express (PCIe), universal asynchronous receiver-transmitter (UART), universal serial bus (USB), general-purpose input/output (GPIO) or the like. According one embodiment, the beamforming enveloper 1110 may perform at least some of the functions of the processor 310 or the communication processor 330 illustrated in FIG. 3.

The n antennas may be spaced apart by a distance d (e.g., FIG. 4A). According to various embodiments of the disclosure, each antenna may be connected to the switch and may be selectively connected to a Tx chain in the case of a transmit (Tx) mode and to an Rx chain in the case of a receive (Rx) mode in performing time division duplex (TDD) communication.

According to various embodiments, a first transmission chain corresponding to a first antenna 1170-1 may include a first power amplifier (power amp) 1156-4, a first variable gain amplifier 1156-3, a phase shifter 1156-2, a second variable gain amplifier 1156-1, an n way Tx splitter 1154, or a mixer 1151, within an RF-IC.

According to various embodiments, the first power amplifier 1156-4 serves as a large power amplification of the Tx signal. The first power amplifier 1156-4 may be mounted within the radio frequency integrated circuit 1150 or outside the radio frequency integrated circuit 1150. Each of the variable gain amplifiers 1156-1 and 1156-3 is controlled by the communication processor 1130 to perform a Tx auto gain control operation. The number of variable gain amplifiers may be increased or decreased in some cases. For example, the number of variable gain amplifiers included in the transmission chain of FIG. 11 may be two.

The phase shifter 1156-2 according to various embodiments may shift the phase of the signal according to the beamforming angle under the control of the communication processor 1130. The n way Tx splitter 1154 may split the transmission signal received from the mixer 1151 into n signals. The mixer 1151 may up-convert a transmission intermediate frequency (Tx-IF) signal received from the intermediate frequency integrated circuit 1140 into a Tx signal (RF band). The mixer 1151 may receive a signal to be mixed from an internal or external oscillator.

The receive chain corresponding to the first antenna 1170-1 may include a low-noise amplifier 1157-3, a phase shifter 1157-2, a first variable gain amplifier 1157-1, an n way RX combiner 1155, a second variable gain amplifier 1153, and a mixer 1152, within the radio frequency integrated circuit.

The low-noise amplifier 1157-3 according to various embodiments may serve as the low-noise amplification of the signal received from the antenna. Each of the variable gain amplifiers 1156-1 and 1153-3 is controlled by the communication processor 1130 to perform an Rx auto gain control operation. The number of variable gain amplifiers may be increased or decreased in some cases. For example, the receive chain illustrated in FIG. 11 may include two variable gain amplifiers 1156-1 and 1153. The phase shifter 1157-2 may shift the phase of the signal according to the traveling direction of the signal forming the beam under the control of the communication processor 1130. The n way RX combiner 1155 may phase-shifted to combine signals that are aligned in an in phase. The combined signal is transferred to the mixer 1152 via the second variable gain amplifier 1153. The mixer 1152 may perform down-conversion of the received signal from the RF band to the IF band.

The mixer 1152 may receive a signal to be mixed from an internal or external oscillator.

According to various embodiments, reference numeral 1150 may include a plurality of Tx chains and a plurality of Rx chains. For example, the transmit chain corresponding to the n-th antenna 1170-n may be included. The transmit chain corresponding to the n-th antenna 1170-n may include an amplifier 1158-4, variable gain amplifiers 1158-1 and 1158-3, and a phase shifter 1158-2. The receive chain corresponding to the n-th antenna 1170-n may include a low-noise amplifier 1159-3, a phase shifter 1159-2, and a variable gain amplifier 1159-1.

According to various embodiments, the radio frequency integrated circuit 1150 may further include a switch for selectively connecting the Rx/Tx chains to a rear end of the mixer in the Radio frequency integrated circuit 1150. When the intermediate frequency is high, it may be difficult to connect to a transmission line between the radio frequency integrated circuit 1150/intermediate frequency integrated circuit 1140. When the Tx/Rx chain is selectively connected by the switch upon the TDD operation, the number of transmission lines between the radio frequency integrated circuit 1150 and the intermediate frequency integrated circuit 1140 may be reduced.

According to various embodiments, like the radio frequency integrated circuit 1150, even the intermediate frequency integrated circuit 1140 may include a switch for selectively connecting the Rx/Tx chains.

According to various embodiments, the transmit chain inside the intermediate frequency processing integrated circuit 1140 includes a quadrature mixer 1145, a third variable gain amplifier 1141-4, a low pass filter 1141-3, a fourth variable gain amplifier 1141-2, and a buffer 1141-1. The buffer 1141-1 may serve as a buffer upon receiving a balanced Tx I/Q signal from the communication processor 1130 to stably process a signal. The third variable gain amplifier 1141-4 and the fourth variable gain amplifier 1141-1 may be controlled by the communication processor 1130 to perform the Tx auto gain control. The low pass filter 1141-3 may serve as a channel filter by operating a Tx IQ signal in a baseband with a cutoff frequency. The cutoff frequency is variable. The orthogonal mixer 1145 serves as the up-conversion of the balanced Tx I/Q signal to the Tx-IF signal.

According to various embodiments, the intermediate frequency integrated circuit 1140 may include a plurality of transmit chains Referring to FIG. 11, the intermediate frequency integrated circuit 1140 may further include another transmit chain, and another transmit chain may include buffer 1142-1, variable gain amplifiers 1142-2 and 1142-4, and a low pass filter 1142-3. The transmit chains may use an orthogonal mixer 1145 together.

According to various embodiments, the receive chain inside the intermediate frequency integrated circuit 1140 includes a quadrature mixer 1146, a third variable gain amplifier 1143-4, a low pass filter 1143-3, a fourth variable gain amplifier 1143-2, and a buffer 1143-1. The buffer 1143-1 serves as a buffer when transmitting the balanced Rx I/Q to the communication processor 1130 through the fourth variable gain amplifier 1143-2 to stably process a signal. The third variable gain amplifier 1143-4 and the fourth variable gain amplifier 1143-2 may be controlled by the communication processor 1130 to perform the Rx auto gain control. The low pass filter 1143-3 serves as the channel filter by operating the bandwidth of the balanced Rx IQ signal in the baseband with the cutoff frequency. The cutoff frequency is variable. The orthogonal mixer 1146 serves to generate the balanced Rx I/Q signal by performing the down-conversion into the Rx-IF signal.

According to various embodiments, the transceiver 1180 (e.g., transceiver 340, transceiver 940) may be a circuit including the intermediate frequency integrated circuit 1140 and the radio frequency integrated circuit 1150 illustrated in FIG. 11.

According to various embodiments, the Tx I/Q digital to analog converter (DAC) 1143-1 in the communications processor 1130 converts a digital signal modulated by a modem into the balanced Tx I/Q signal and transmit it to the intermediate frequency integrated circuit 1140.

According to various embodiments, the Rx I/Q ADC 1143-2 in the communication processor 1130 serves to convert the balanced Rx/IQ signal down-converted by the intermediate frequency integrated circuit 1132 into the digital signal and transmit it to the modem. The communication processor 1130 calculates the envelope of the Tx signal from the Tx I/Q and converts the calculated envelope into an analog signal through an envelope digital to analog converter (DAC) and transmits it to the beamforming enveloper 1110. The envelope signal may be transmitted to the beamforming enveloper 1110 in digital form.

According to various embodiments, supply modulators 1121-1 and 1121-n (e.g., power supply modules 321-1 and 321-2) are controlled by the communication processor 1130 and the beamforming enveloper 1110 (e.g., processor 310) to supply power to each power amplifier. The operation related to the beamforming enveloper is included in the description of FIG. 5.

Figure 12A:
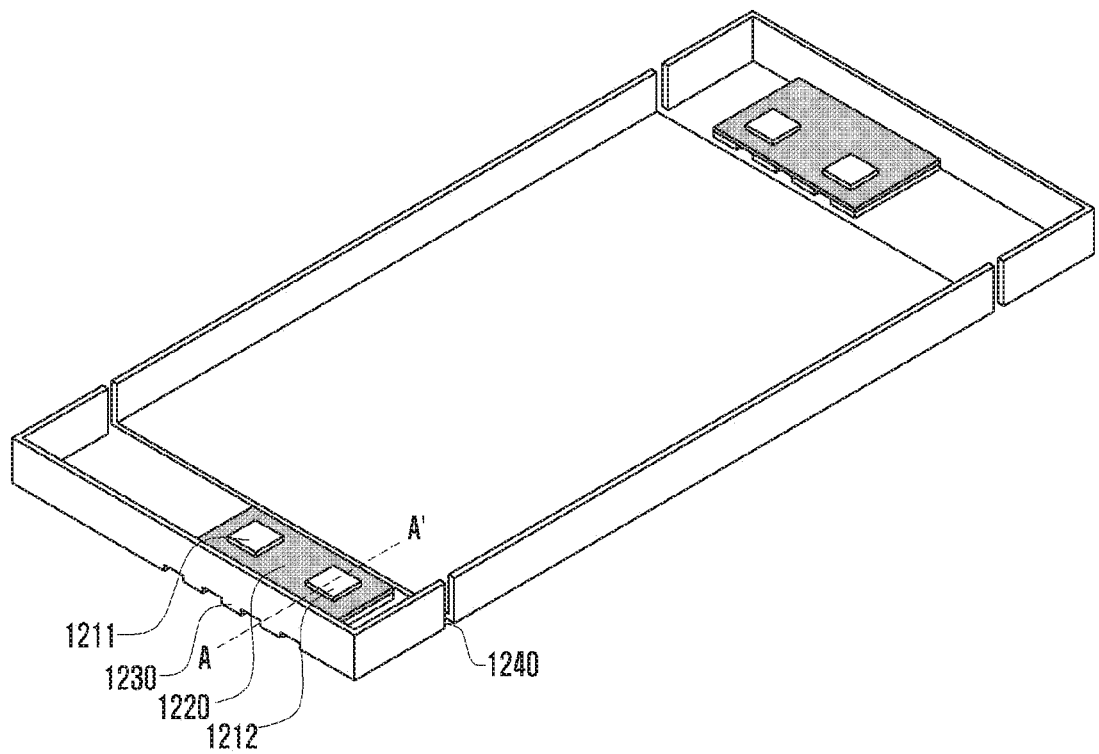
FIGS. 12A and 12B illustrate an embodiment in which an antenna and components are disposed in an electronic device according to various embodiments of the disclosure.
Figure 12B:
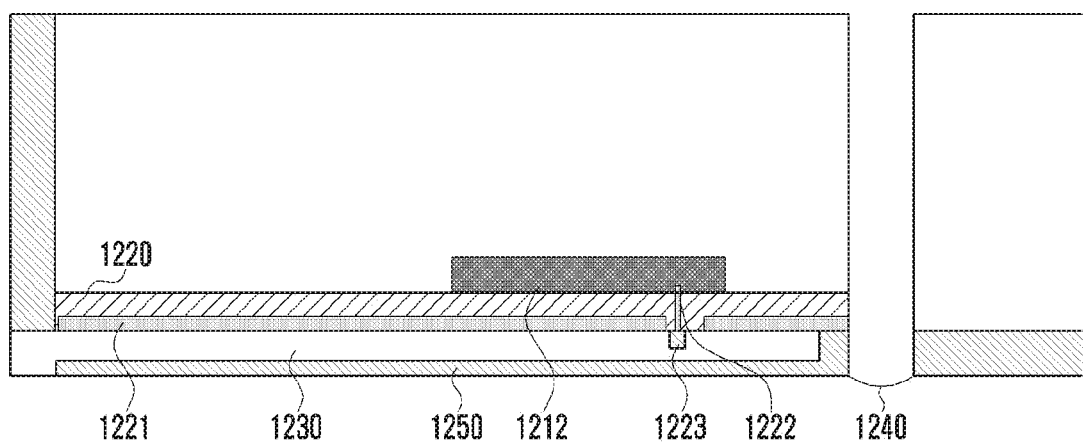

FIGS. 12A and 12B illustrate an embodiment in which an antenna and components are disposed in an electronic device according to various embodiments of the disclosure.

FIG. 12A illustrates a communication circuit and an antenna implemented in a metal housing. A main printed circuit board/display/battery or the like are omitted.

An antenna 1230 is formed in a waveguide shape and may support a very high frequency band. Referring to FIG. 12A, 4 array antennas are arranged at upper and lower ends of the housing. Although one of the radio frequency integrated circuits 1211 and 1212 is illustrated as being responsible for two antennas, this is only an example. One radio frequency integrated circuit may be responsible for a larger number of antennas. In the very high frequency band, the radio frequency integrated circuits 1211 to 1212 and the antenna 1230 can be mounted immediately adjacent to each other because of a large transmission line loss. The antenna according to various embodiments of the disclosure may be attached to a flexible circuit board on which the radio frequency integrated circuit is mounted.

A conductive housing segment generated by a segment 1240 may be used as the existing antenna (below 5 GHz band). The signal in the existing band has a large wavelength and may not enter the waveguide type antenna. In other words, even if different antennas are configured using the same conductor, the interference may not occur.

FIG. 12B is a cross-sectional view of the electronic device illustrated in FIG. 12A taken along the line A-A'. A slot of the conductive housing 1250 and a ground layer (GND layer) 1221 at a lower end part of the substrate may form the waveguide 1230. The radio frequency integrated circuit 1212 and a feeder 1223 are connected through a via 1222 on the circuit board. This is only an embodiment and an antenna or the like implemented in the form of a patch may also be mounted on a rear surface of the housing and a bezel portion.

The electronic device according to various embodiments of the disclosure includes a first amplifier (e.g., first amplifier 350-1) for amplifying a first signal and a second amplifier (e.g., second amplifier 350-2) for amplifying a second signal; a first antenna (e.g., first antenna 370-1) corresponding to the first amplifier and a second antenna (e.g., second antenna 370-2) corresponding to the second amplifier; at least one power supply module (e.g., first power supply module 321-1 and second power supply module 321-2) for supplying power to the first amplifier and the second amplifier; and a processor (e.g., processor 310), wherein the processor is configured to generate first power control information based at least in part on the amplitude information of the first signal; generate second power control information based at least in part on the first power control information and the delay time of the second signal with respect to the first signal; control the power supplied to the first amplifier to amplify the first signal using the at least one power supply module based at least in part on the first power control information and discharge the amplified first signal through the first antenna; control the power supplied to the second amplifier to amplify the second signal using the at least one power supply module based at least in part on the second power control information and discharge the amplified second signal through the second antenna after the discharge of the first signal.

The processor may be configured to apply as the delay time the first delay time for beamforming the first signal and the second signal in the first direction or the second delay time for beamforming the first signal and the second signal in the second direction.

The processor may be configured to confirm the envelope of the first signal based on the amplitude information of the first signal and generate the first power control information to correspond to the envelope.

The processor may be configured to confirm the average amplitude of the first signal over the specified time period based at least in part on the amplitude information and generate the first power control information to correspond to the average amplitude.

The at least one power supply module includes the first power supply module (e.g., first power supply module 321-1) and the second power supply module (e.g., second power supply module 321-2), and the processor may be set to control the power supplied to the first amplifier using the first power supply mode and control the power supplied to the second amplifier using the second power supply module.

The processor may generate the second signal based on the first signal and the delay information of the second signal with respect to the first signal.

The electronic device according to various embodiments of the disclosure includes a plurality of amplifiers including a first amplifier (e.g., first amplifier 350-1) for amplifying a first signal and a second amplifier (e.g., second amplifier 350-2) for amplifying a second signal; at least one power supply module (e.g., first power supply module 321-1 and second power supply module 321-2) for supplying power to the first amplifier and the second amplifier; and a processor (e.g., processor 310), wherein the processor is configured to be generate first power control information based at least on the attribute of the first signal; generate second power control information based at least in part on the first power control information and the attribute of the second signal; control the power supplied to the first amplifier to amplify the first signal using the at least one power supply module based at least in part on the first power control information, and control the power supplied to the second amplifier to amplify the second signal using the at least one power supply module based at least in part on the second power control information.

The attribute of the second signal includes the delay time of the second signal with respect to the first signal, and the processor may be configured to apply the first delay time for beamforming the first signal and the second signal in the first direction or the second delay time for beamforming the first signal and the second signal in the second direction.

The processor may be configured to generate the second power control information based at least in part on the first power control information and the delay time.

The attribute of the first signal includes the phase information of the first signal and the attribute of the second signal includes the phase information of the second signal, and the processor may be configured to confirm the delay time of the second signal with respect to the first signal based at least on the phase information of the first signal and the phase information of the second signal.

The processor may be configured to generate the second power control information based at least on the first power control information and the delay time.

The attribute of the first signal includes the instantaneous amplitude information of the first signal, and the processor may be configured to confirm the envelope of the first signal based on the instantaneous amplitude information and generate the first power control information to correspond to the envelope of the first signal.

The attribute of the first signal includes the amplitude information of the first signal, and the processor may be configured to confirm the average amplitude of the first signal over the specified time period based on the amplitude information and generate the first power control information to correspond to the average amplitude.

The electronic device further includes the first antenna corresponding to the first amplifier and the second antenna corresponding to the second amplifier, and the processor may be configured to discharge the first signal amplified based on the first power control information through the first antenna and discharge the amplified second signal through the second antenna based at least on the second power control information after the discharge of the first signal.

The at least one power supply module includes the first power supply module and the second power supply module, and the processor may be configured to control the power supplied to the first amplifier using the first power supply module; and control the power supplied to the second amplifier using the second power supply module.

The processor may form at least a part of the power control module for controlling the power supply module based at least on the first power control information or the second power control information.

The electronic device according to another embodiment of the disclosure includes the first amplifier (e.g., first amplifier 350-1) for amplifying the first signal and the second amplifier (e.g., second amplifier 350-2) for amplifying the second signal; the power control module (e.g., processor 310) for generating the first power control information based at least on the first attribute of the first signal and the second power control information based at least on the first power control information and the second attribute of the second signal; and at least one power supply module (e.g., first power supply module 321-1, second power supply module 321-2, power supply module 920) for controlling the power supplied to the first amplifier based at least on the first power control information and the power supplied to the second amplifier based at least on the second power control information.

The second attribute includes the delay time of the second signal with respect to the first signal, and the power control module may be configured to apply the first delay time for beamforming the first signal and the second signal in the first direction or the second delay time for beamforming the first signal and the second signal in the second direction.

The power control module may be configured to generate the second power control information based at least on the first power control information and the delay time.

In addition, the electronic device according to another embodiment of the disclosure may further include the processor for confirming the first attribute or the second attribute.

Figure 13:
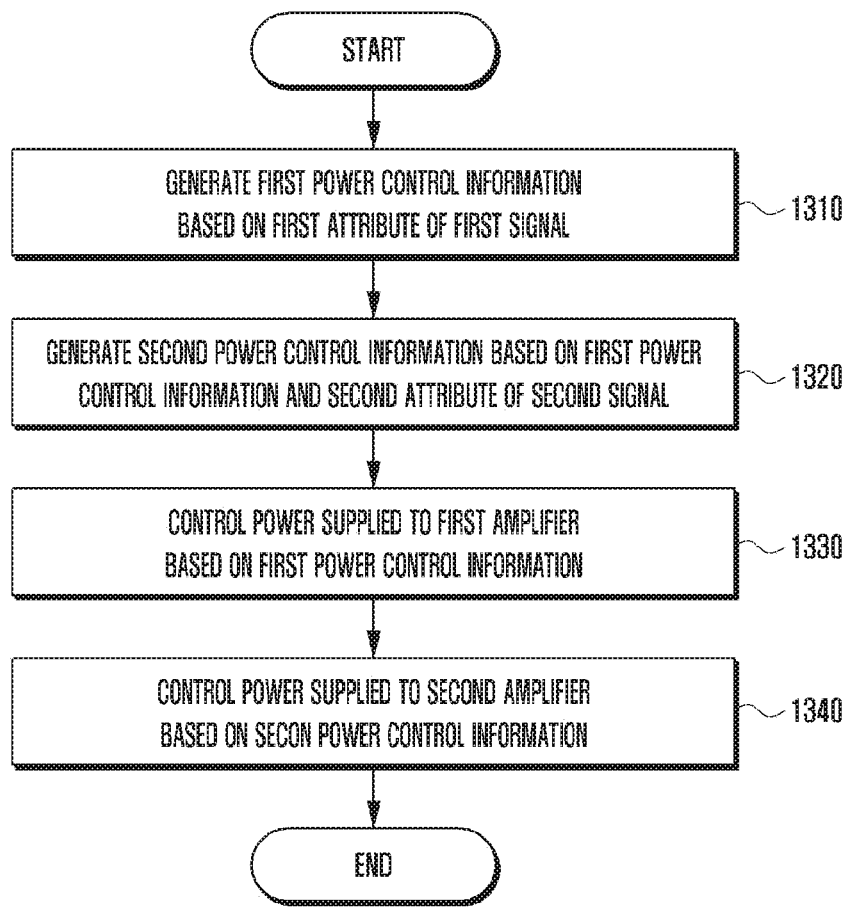
FIG. 13 is an operational flow chart illustrating a method of operating an electronic device according to various embodiments of the disclosure.

FIG. 13 is an operational flow chart illustrating a method of operating an electronic device according to various embodiments of the disclosure.

Referring to FIG. 13, a method of operating an electronic device according to various embodiments of the disclosure may generate the first power control information based on the first attribute of the first signal at operation 1310. The first attribute may include the amplitude information of the first signal.

The processor 310 may confirm the envelope of the first signal based on the first attribute of the first signal and generate the first power information to correspond to the confirmed envelope. According to another embodiment of the disclosure, the processor 310 may confirm the average amplitude or the average intensity of the first signal over the specified time period based on the amplitude information of the first signal, and generate the first power information corresponding to the confirmed average amplitude or average intensity.

The processor 310 may generate the second power control information based on the first power control information and the second attribute of the second signal at operation 1320.

According to various embodiments of the disclosure, the second attribute of the second signal may include the delay time of the second signal with respect to the first signal. The delay time may be associated with the beamforming angle, and the delay time of the second signal has been described above with reference to FIGS. 4A and 4B.

The processor 310 may control the power supplied to the first amplifier based on the first power control information at operation 1330. The processor 3120 may control the power supplied to the second amplifier based on the second power control information at operation 1340.

The method above is described with reference to flowcharts, methods, and computer program products according to various embodiments of the disclosure. It will be understood that each block of the flowcharts, and combinations of blocks in the flowcharts, may be implemented by computer program instructions. The computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowcharts may represent a module, a segment, or a portion of code, which includes one or more executable instructions for implementing the specified logical function(s). It should also be noted that in some alternative implementations, the functions noted in the blocks may occur out of order. For example, two blocks shown in succession may, in fact, be executed substantially concurrently or the blocks may sometimes be executed in the reverse order, depending upon the functionality involved.

Certain aspects of the disclosure may also be embodied as computer readable code on a non-transitory computer readable recording medium. A non-transitory computer readable recording medium is any data storage device that may store data which may be thereafter read by a computer system. Examples of a non-transitory computer readable recording medium include a ROM, a RAM, compact disc-ROMs (CD-ROMs), magnetic tapes, floppy disks, and optical data storage devices. A non-transitory computer readable recording medium may also be distributed over network coupled computer systems so that computer readable code is stored and executed in a distributed fashion. In addition, functional programs, code, and code segments for accomplishing the disclosure may be easily construed by programmers skilled in the art to which the disclosure pertains.

Embodiments of the disclosure may involve the processing of input data and the generation of output data to some extent. The input data processing and output data generation may be implemented in hardware or software in combination with hardware. For example, certain electronic components may be employed in a mobile device or similar or related circuitry for implementing the functions associated with the various embodiments of the disclosure. Alternatively, one or more processors operating in accordance with stored instructions may implement the functions associated with the various embodiments of the disclosure. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure may be easily construed by programmers skilled in the art to which the disclosure pertains.

Aspects of the various embodiments of the disclosure may be implemented in hardware, firmware or via the execution of software or computer code that may be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods of the disclosure may be rendered via such software that is stored on the recording medium using a general purpose computer, or a special processor or in programmable or dedicated hardware, such as an ASIC or an FPGA. As would be understood in the art, a computer, a processor, a microprocessor controller or programmable hardware include memory components, e.g., RAM, ROM, flash memory, etc. that may store or receive software or computer code that when accessed and executed by the computer, the processor or the hardware implement the methods of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a first amplifier configured to amplify a first signal;
   a second amplifier configured to amplify a second signal;
   a first antenna corresponding to the first amplifier;
   a second antenna corresponding to the second amplifier;
   at least one power supply module configured to control a first voltage of a first power to be supplied to the first amplifier and a second voltage of a second power to be supplied to the second amplifier; and
   at least one processor configured to:
      generate first power control information based at least in part on amplitude information of the first signal,
      generate second power control information based at least in part on the first power control information and a delay time of the second signal with respect to the first signal,
      control the first voltage supplied to the first amplifier to amplify the first signal using the at least one power supply module based at least in part on the first power control information and radiate the amplified first signal through the first antenna, and
      control the second voltage supplied to the second amplifier to amplify the second signal using the at least one power supply module based at least in part on the second power control information and radiate the amplified second signal through the second antenna after the discharge of the first signal.

2. The electronic device of claim 1, wherein the at least one processor is further configured to:
   apply as the delay time a first delay time for beamforming the first signal and the second signal in a first direction, or
   apply as the delay time a second delay time for beamforming the first signal and the second signal in a second direction.

3. The electronic device of claim 1, wherein the at least one processor is further configured to:
   confirm an envelope of the first signal based on the amplitude information of the first signal, and
   generate the first power control information to correspond to the envelope.

4. The electronic device of claim 1, wherein the at least one processor is further configured to:
   confirm an average amplitude of the first signal over a specified time period based at least on the amplitude information of the first signal, and
   generate the first power control information to correspond to the average amplitude.

5. The electronic device of claim 1,
wherein the at least one power supply module includes a first power supply module and a second power supply module, and
wherein the at least one processor is further configured to:
control the first voltage supplied to the first amplifier using the first power supply module, and
control the second voltage supplied to the second amplifier using the second power supply module.

6. The electronic device of claim 1, wherein the at least one processor is further configured to:
generate the second signal based on the first signal, and
delay information of the second signal with respect to the first signal.

7. An electronic device, comprising:
a plurality of amplifiers including a first amplifier for amplifying a first signal and a second amplifier for amplifying a second signal;
at least one power supply module configured to control a first voltage of a first power to be supplied to the first amplifier and a second voltage of a second power to be supplied to the second amplifier; and
at least one processor configured to:
generate first power control information based at least on an attribute of the first signal,
generate second power control information based at least in part on the first power control information and the attribute of the second signal,
control the first voltage supplied to the first amplifier to amplify the first signal using the at least one power supply module based at least in part on the first power control information, and
control the second voltage supplied to the second amplifier to amplify the second signal using the at least one power supply module based at least in part on the second power control information.

8. The electronic device of claim 7,
wherein the attribute of the second signal includes a delay time of the second signal with respect to the first signal, and
wherein the at least one processor is further configured to:
apply as the delay time a first delay time for beamforming the first signal and the second signal in a first direction, or
apply as the delay time a second delay time for beamforming the first signal and the second signal in a second direction.

9. The electronic device of claim 8, wherein the apply as the delay time processor is further configured to generate the second power control information based at least in part on the first power control information and the delay time.

10. The electronic device of claim 7,
wherein the attribute of the first signal includes phase information of the first signal, and the attribute of the second signal includes phase information of the second signal, and
wherein the apply as the delay time processor is further configured to confirm a delay time of the second signal with respect to the first signal based at least on the phase information of the first signal and the phase information of the second signal.

11. The electronic device of claim 10, wherein the apply as the delay time processor is further configured to generate the second power control information based at least on the first power control information and the delay time.

12. The electronic device of claim 7,
wherein the attribute of the first signal includes instantaneous amplitude information of the first signal, and
wherein the apply as the delay time processor is further configured to:
confirm an envelope of the first signal based on the instantaneous amplitude information of the first signal, and
generate the first power control information to correspond to the envelope of the first signal.

13. The electronic device of claim 7,
wherein the attribute of the first signal includes amplitude information of the first signal, and
wherein the at least one processor is further configured to:
confirm an average amplitude of the first signal over a specified time period based on the amplitude information, and
generate the first power control information to correspond to the average amplitude.

14. The electronic device of claim 7, further comprising:
a first antenna corresponding to the first amplifier; and
a second antenna corresponding to the second amplifier,
wherein the at least one processor is further configured to:
discharge the first signal amplified based at least on the first power control information through the first antenna, and
discharge the second signal amplified based at least on the second power control information through the second antenna after the discharge of the first signal.

15. The electronic device of claim 7,
wherein the at least one power supply module includes a first power supply module and a second power supply module, and
wherein the at least one processor is further configured to control the first voltage supplied to the first amplifier using the first power supply module and the second voltage supplied to the second amplifier using the second power supply module.

16. The electronic device of claim 7, wherein the at least one processor is further configured to form at least part of the power control module for controlling the power supply module based at least on the first power control information or the second power control information.

17. An electronic device, comprising:
a first amplifier for amplifying a first signal;
a second amplifier for amplifying a second signal;
a power control module configured to generate power control information based at least on an amplitude information of the first signal and a delay time of the second signal with respect to the first signal, the delay time being determined based on a direction of beamforming the first signal and the second signal; and
at least one power supply module configured to:
control a voltage supplied to the first amplifier to amplify the first signal, and
control a voltage supplied to the second amplifier to amplify the second signal based on the power control information.

18. The electronic device of claim 17,
wherein the power control module is further configured to:
apply as the delay time a first delay time for beamforming the first signal and the second signal in a first direction, or
apply as the delay time a second delay time for beamforming the first signal and the second signal in a second direction.

19. The electronic device of claim 18, wherein the power control module is further configured to:
- identify an envelope of the first signal based on the amplitude information of the first signal,
- identify an envelope of the second signal based on the envelope of the first signal and the delay time, and
- generate the power control information to correspond to the envelope of the first signal and the envelope of the second signal.

20. The electronic device of claim 17, wherein the power control module is further configured to:
- identify at least a first voltage corresponding to the first envelope at a specific time as at least a portion of an operation of identifying the first envelope,
- identify at least a second voltage corresponding to the second envelope at the specific time as at least a portion of an operation of identifying the second envelope, and
- generate a value corresponding to a larger value of the first voltage and the second voltage as at least a portion of the power control information at the specified time.

21. The electronic device of claim 17, wherein the power control module is further configured to:
- identify a first average amplitude of the first signal for a specified time interval based at least part on the amplitude information,
- identify a second average amplitude of the second signal for the specified time interval based on the first average amplitude and the delay time, and
- generate the power control information based on the first average amplitude and the second average amplitude.

22. The electronic device of claim 21, wherein the power control module is further configured to:
- generate a value corresponding to a larger value of the first average amplitude and the second average amplitude as at least a portion of the power control information at the specified time interval.

23. An electronic device, comprising:
- a first antenna;
- a second antenna;
- a first amplifier for generating the first amplified signal by amplifying a first signal, the first amplifier being electronically connected to the first antenna;
- a second amplifier for generating the second amplified signal by amplifying a second signal, the second amplifier being electronically connected to the second antenna;
- a power control module for generating a power control signal based at least part on an amplitude of the first signal and a delay time of the second signal with respect to the first signal, the delay time being determined based on a direction of beamforming the first signal and the second signal; and
- at least one power supply module configured to:
  - control a voltage supplied to the first amplifier to amplify the first signal, and
  - control a voltage supplied to the second amplifier to amplify the second signal based on the power control information.

24. The electronic device of claim 23, wherein the power control module is further configured to:
- transitioning the power control signal from a first state to a second state when a magnitude of the amplitude satisfies a first specified condition, and
- maintaining the power control signal in the second state for the delay time and transitioning the power control signal from the second state to the first state after the delay time when a magnitude of the amplitude satisfies a second specified condition.

25. The electronic device of claim 24, wherein the at least one power supply module is further configured to:
- adjust the voltage to a first specified value in response to the power control signal transited to the first state, and
- adjust the voltage to a second specified value in response to the power control signal transited to the second state.

26. The electronic device of claim 24, wherein the at least one power supply module is further configured to:
- determining that the magnitude of the amplitude satisfies the first specified condition if the magnitude of the amplitude is expected to increase beyond a specified range, and
- determining that the magnitude of the amplitude satisfies the second specified condition if the magnitude of the amplitude is expected to decrease beyond the specified range or another specified range.

* * * * *